United States Patent
Zheng

(10) Patent No.: US 8,428,456 B2
(45) Date of Patent: Apr. 23, 2013

(54) PASSIVE OPTICAL NETWORK PROTECTION METHOD, SWITCHOVER CONTROL DEVICE, AND PASSIVE OPTICAL NETWORK PROTECTION SYSTEM

(75) Inventor: Ruobin Zheng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/222,964

(22) Filed: Aug. 31, 2011

(65) Prior Publication Data

US 2011/0317995 A1 Dec. 29, 2011

Related U.S. Application Data

(63) Continuation of application No. PCT/CN2010/071304, filed on Mar. 25, 2010.

(30) Foreign Application Priority Data

| Apr. 2, 2009 | (CN) | ............................ 2009 1 0133114 |
| Jun. 29, 2009 | (CN) | ............................ 2009 1 0149578 |

(51) Int. Cl.
    *H04B 10/08* (2006.01)
(52) U.S. Cl.
    USPC ....................................... 398/2; 398/5; 398/7
(58) Field of Classification Search .................. 398/2, 5, 398/7
    See application file for complete search history.

(56) References Cited

U.S. PATENT DOCUMENTS

| 6,975,586 B1* | 12/2005 | Yoshimura ..................... 370/217 |
| 2007/0058973 A1 | 3/2007 | Tanaka |
| 2010/0098407 A1* | 4/2010 | Goswami et al. ................. 398/5 |

FOREIGN PATENT DOCUMENTS

| CN | 1599292 A | 3/2005 |
| CN | 1703008 A | 11/2005 |
| CN | 1925370 A | 3/2007 |

OTHER PUBLICATIONS

International Search Report issued in corresponding PCT Patent Application No. PCT/CN2010/071304, mailed Jul. 1, 2010.
Extended European Search Report issued in corresponding European Patent Application No. 10758025.0, mailed Sep. 29, 2011.
Written Opinion of the International Searching Authority issued in corresponding PCT Patent Application No. PCT/CN2010/071304, mailed Jul. 1, 2010.
Tanaka et al., "1:N OLT Redundant Protection Architecture in Ethernet PON System" IEEE 2008.
Xu et al., "Proposal of a New Protection Mechanism for ATM PON Interface" ICC, IEEE International Conference on Communications 2001.
Office Action issued in corresponding Chinese Patent Application No. 200910149578.2, mailed Feb. 7, 2013.

* cited by examiner

*Primary Examiner* — Leslie Pascal
(74) *Attorney, Agent, or Firm* — Brinks Hofer Gilson & Lione

(57) ABSTRACT

The present invention discloses a passive optical network (PON) protection method, a switchover control device, and a PON protection system. In embodiments of the present invention, a protection optical line terminal (OLT) is connected to optical links of at least two working OLTs through the switchover control device; when a working OLT or working optical link fails, the switchover control device replaces the working OLT through the protection optical link, thus ensuring smooth communication. In addition, by using the networking mode of multiple working OLTs and one protection OLT, the embodiments of the present invention greatly saves the networking cost and facilitates the application of the PON technology.

4 Claims, 23 Drawing Sheets

PASSIVE OPTICAL NETWORK PROTECTION METHOD, SWITCHOVER CONTROL DEVICE, AND PASSIVE OPTICAL NETWORK PROTECTION SYSTEM

CROSS-REFERENCE TO RELATED APPLICATIONS

This application is a continuation of International Application No. PCT/CN2010/071304, filed on Mar. 25, 2010, which claims priority to Chinese Patent Application No. 200910133114.2, filed on Apr. 2, 2009 and Chinese Patent Application No. 200910149578.2, filed on Jun. 29, 2009, all of which are hereby incorporated by reference in their entireties.

FIELD OF THE APPLICATION

The present application relates to optical communication technologies, and in particular, to a passive optical network (PON) protection method, a switchover control device, and a PON protection system.

BACKGROUND OF THE APPLICATION

The PON (Passive Optical Network, PON) technology is a point to multi-point (P2MP) optical access technology. A PON includes an optical line terminal (Optical line terminal, OLT), an optical splitter (Optical splitter) or extender box (Extender Box, EB), optical network units (Optical Network Unit, ONUs) or optical network terminals (Optical Network Terminal, ONTs), and optical fibers connecting these devices. The OLT, as a device at the central office end, is connected to the optical splitter or EB through a feeder fiber, and the optical splitter or EB is connected to each ONU through a separate drop fiber. A feeder fiber exists between the optical splitter or EB and the OLT, and several drop fibers exist between the optical splitter or EB and the ONUs. In the downlink direction (OLT->ONU), the optical splitter or EB implements optical splitting function and sends the downlink optical signals of the OLT to all ONUs through drop fibers. In the uplink direction (ONU->OLT), the optical splitter or EB converges optical signals sent by all ONUs and sends the signals to the OLT through the feeder fiber.

At present, to handle failures of the feeder fiber between the optical splitter or EB and the OLT or failures of the OLT, the 1+1 protection architecture shown in FIG. 1 is usually applied. The architecture uses two sets of working/protection feeder fibers and OLTs to provide 1+1 protection for the feeder fiber and OLT. When the working feeder fiber or OLT fails, the protection OLT takes over the ONU under the previously working OLT.

Though the solution may protect the feeder fiber and OLT, each OLT needs a protection OLT and the network construction cost is high. As a result, access applications of enterprise users and dedicated line users of the PON are hindered.

SUMMARY OF THE APPLICATION

Embodiments of the present application provide a PON protection method, a switchover control device, and a PON protection system, so that one protection OLT may be used to protect multiple working OLTs.

A PON protection method according to an embodiment of the present application includes:

receiving, by a switchover control device connected to optical links of at least two working OLTs, a switchover request, where the switchover request carries information about a working OLT or optical link information of the working OLT;

connecting a protection optical link according to the information about the working OLT or the optical link information of the working OLT; and taking over, by a protection OLT, an ONU or ONT under the working OLT.

A PON protection method according to an embodiment of the present application includes:

monitoring, by a switchover control device, optical transmission data from an ONU or ONT port by using an optical splitting device connected to an optical link of a working OLT;

determining whether the working OLT or the optical link of the working OLT fails, and if the working OLT or the optical link of the working OLT fails, connecting a protection optical link, where the switchover control device is connected to optical splitting devices on optical links of at least two working OLTs; and instructing a protection OLT to take over an ONU or ONT under the working OLT.

A switchover control device according to an embodiment of the present application includes:

a control information receiving unit, configured to receive a switchover request, where the switchover request carries information about a working OLT or optical link information of the working OLT;

a splitting unit, configured to connect to optical links of at least two working OLTs; and a switchover controlling unit, configured to connect a protection optical link according to the information about the working OLT or the optical link information of the working OLT, after the control information receiving unit receives the switchover request.

A switchover control device according to an embodiment of the present application includes:

a detecting unit, configured to connect to an optical splitting device on an optical link of a working OLT, monitor an ONU port, and feed back the monitoring result to a switchover controlling unit;

a splitting unit, configured to connect to optical links of at least two working OLTs; and the switchover controlling unit, configured to determine whether the working OLT or the optical link of the working OLT fails according to the monitoring result, and if the working OLT or the optical link of the working OLT fails, connect a protection optical link; and instruct a protection OLT to take over an ONU or ONT under the working OLT.

A PON protection system according to an embodiment of the present application includes: a protection OLT, a switchover control device, and at least two working OLTs and corresponding optical links, where:

the protection OLT communicates with the switchover control device through a Layer 2 Control Protocol (L2CP) or ONU Management and Control Interface (OMCI) message or an Ethernet Operation, Administration and Maintenance (OAM) message;

the switchover control device connected to optical links of at least two working OLTs, is configured to receive a switchover request, where the switchover request carries information about a working OLT or optical link information of the working OLT; and connect a protection optical link according to the information about the working OLT or the optical link information of the working OLT; and the protection OLT is configured to send the switchover request to the switchover control device; and take over an ONU or ONT under the working OLT after the protection optical link is connected.

A PON protection system according to an embodiment of the present application includes: a protection OLT and a switchover control device, where:

the protection OLT communicates with the switchover control device through an L2CP or OMCI message or an Ethernet OAM message;

the switchover control device, connected to optical splitting devices on optical links of at least two working OLTs, is configured to monitor optical transmission data from an ONU or ONT port through an optical splitting device connected to an optical link of a working OLT, determine whether the working OLT or the optical link of the working OLT fails according to the monitoring result, and if the working OLT or the optical link of the working OLT fails, connect a protection optical link; and the protection OLT is configured to take over an ONU or ONT under the working OLT through the protection optical link, after the switchover control device connects the protection optical link.

In embodiments of the present application, a protection OLT is connected to optical links of at least two working OLTs through the switchover control device. When a working OLT or working optical link fails, the switchover control device replaces the working OLT through the protection optical link, so as to ensure smooth communication. In addition, compared with the prior art, by using the networking mode of multiple working OLTs and one protection OLT, the embodiments of the present application greatly save the networking cost and facilitates the application of the PON technology.

BRIEF DESCRIPTION OF THE DRAWINGS

To describe the technical solutions of the embodiments of the present application or prior art more clearly, the accompanying drawings for the embodiments of the present application or the prior art are briefly described. Apparently, the accompanying drawings are not exhaustive, and persons of ordinary skill in the art can derive other drawings without any creative effort.

DETAILED DESCRIPTION OF THE EMBODIMENTS

To make the objectives, features, and advantages of the present application clearer and more understandable, the following describes the embodiments of the present application in detail with reference to accompanying drawings.

The technical solution of the present application is hereinafter described in detail with reference to the accompanying drawings. Apparently, the embodiments are merely part of rather than all embodiments of the present application. Other embodiments that those skilled in the art derive from embodiments of the present application also fall within the protection scope of the present application.

Embodiments of the present application provide a PON protection method and a corresponding switchover control device and a PON protection system, as detailed below.

The "switchover" in embodiments of the present application may refer to that: all physical ports of the working OLT are switched over to physical ports of the protection OLT; or only physical ports of the working OLT with fiber failures are switched over to physical ports of the protection OLT, and the previously normal physical ports still work on the working OLT normally. The dotted-line blocks marked with "Working" and "Protection" in the accompanying drawings specify the whole OLT particularly in the case that all physical ports of the working OLT are switched over to physical ports of the protection OLT; or specify the physical ports that are switched over particularly in the case that part of the physical ports of the working OLT are switched over to physical ports of the protection OLT. For the latter case, the working OLT and protection OLT work in load-sharing mode.

Embodiment 1

Figure 1:
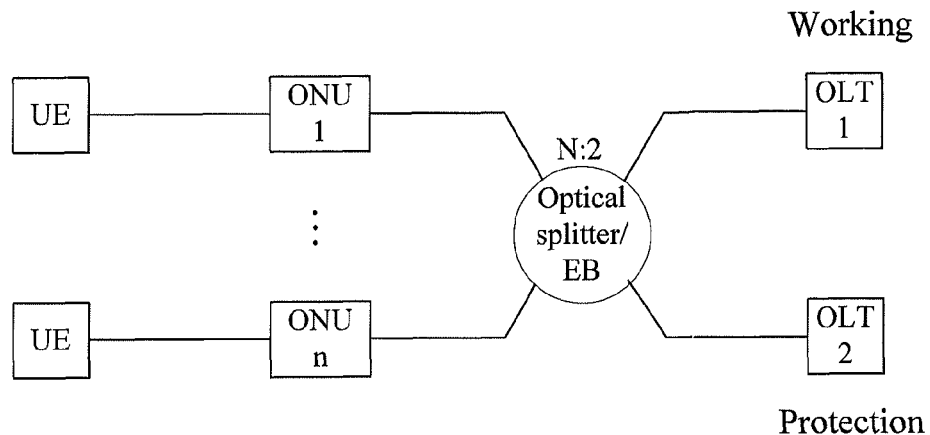
FIG. 1 is a schematic networking diagram of a PON protection solution in a prior art.
Figure 2:
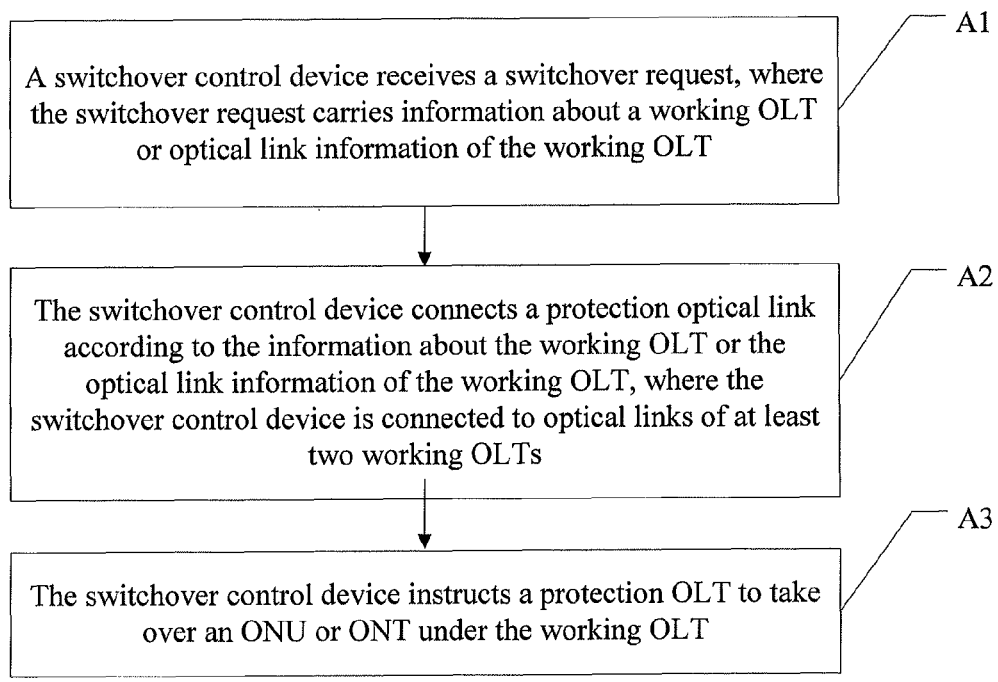
FIG. 2 is a flowchart of a PON protection method according to a first embodiment of the present application.

A PON protection method is provided. As shown in FIG. 2, the method includes the following steps:

A1. A switchover control device receives a switchover request. The switchover request may carry information about a working OLT (such as a communication interface of an optical splitting device corresponding to the working OLT) or optical link information of the working OLT (such as a communication interface of an optical splitting device corresponding to the optical link of the working OLT).

In this embodiment, when a protection OLT learns that the working OLT or the optical link of the working OLT fails, the protection OLT sends a switchover request to the switchover control device. It is appreciated that the switchover request may also be sent by the working OLT or an ONU or EB under the working OLT to the switchover control device. The switchover may be triggered in multiple modes, and therefore whichever device triggers the switchover does not constitute a limitation on the present application.

The ONU or ONT under the working OLT includes: all ONUs or ONTs under the working OLT, or the ONU or ONT corresponding to the faulty port of the working OLT.

For the received switchover request, the protection OLT, or the IP edge node, or the ONU or EB under the working OLT may use L2CP/OMCI/Simple Network Management Protocol (SNMP) messages to notify the EB that a working OLT generates an alarm or that a feeder fiber or the working OLT fails, or directly instruct the EB to start the switchover of the OLTm.

The process of the protection OLT learning that the working OLT or the optical link of the working OLT fails includes the following step:

The protection OLT receives a message sent by a broadband network gateway (Broadband Network Gateway, BNG) or broadband remote access server (Broadband Remote access Server, BRAS), where the message carries information about the faulty working OLT or the faulty optical link of the working OLT.

Or the protection OLT interacts with the working OLT to learn that the working OLT or the optical link of the working OLT fails.

A2. The switchover control device connects a protection optical link according to the information about the working OLT or the optical link information of the working OLT, where the switchover control device is connected to optical links of at least two working OLTs.

In this embodiment, the switchover control device is connected to optical splitting devices on optical links of at least two working OLTs. It is appreciated that the switchover control device may also be connected to an optical link of a working OLT in other ways, for example, directly connected to the ONU or ONT under the working OLT.

In embodiments of the present application, the optical splitting device is an optical splitter or EB, or a device with similar functions.

In this embodiment, the information about the working OLT or the optical link information of the working OLT is used to enable the communication interface with the corresponding optical splitting device, so as to connect the optical link between the ONU under the working OLT and the protection OLT. The ONU under the working OLT and the optical link of the protection OLT may be enabled or disabled in multiple modes, for example, through a mechanical switch or an electronic switch, and the choice of the specific mode does not constitute a limitation on the present application.

A3. Instructing the protection OLT to take over an ONU or ONT under the working OLT.

In the first embodiment, a protection OLT is connected to optical links of at least two working OLTs through the switchover control device. When a working OLT or working optical link fails, the switchover control device replaces the working OLT through the protection optical link, so as to ensure smooth communication. In addition, compared with the prior art, by using the networking mode of multiple working OLTs and one protection OLT, the embodiments of the present application greatly saves the networking cost and facilitates the application of the PON technology.

Figure 3:
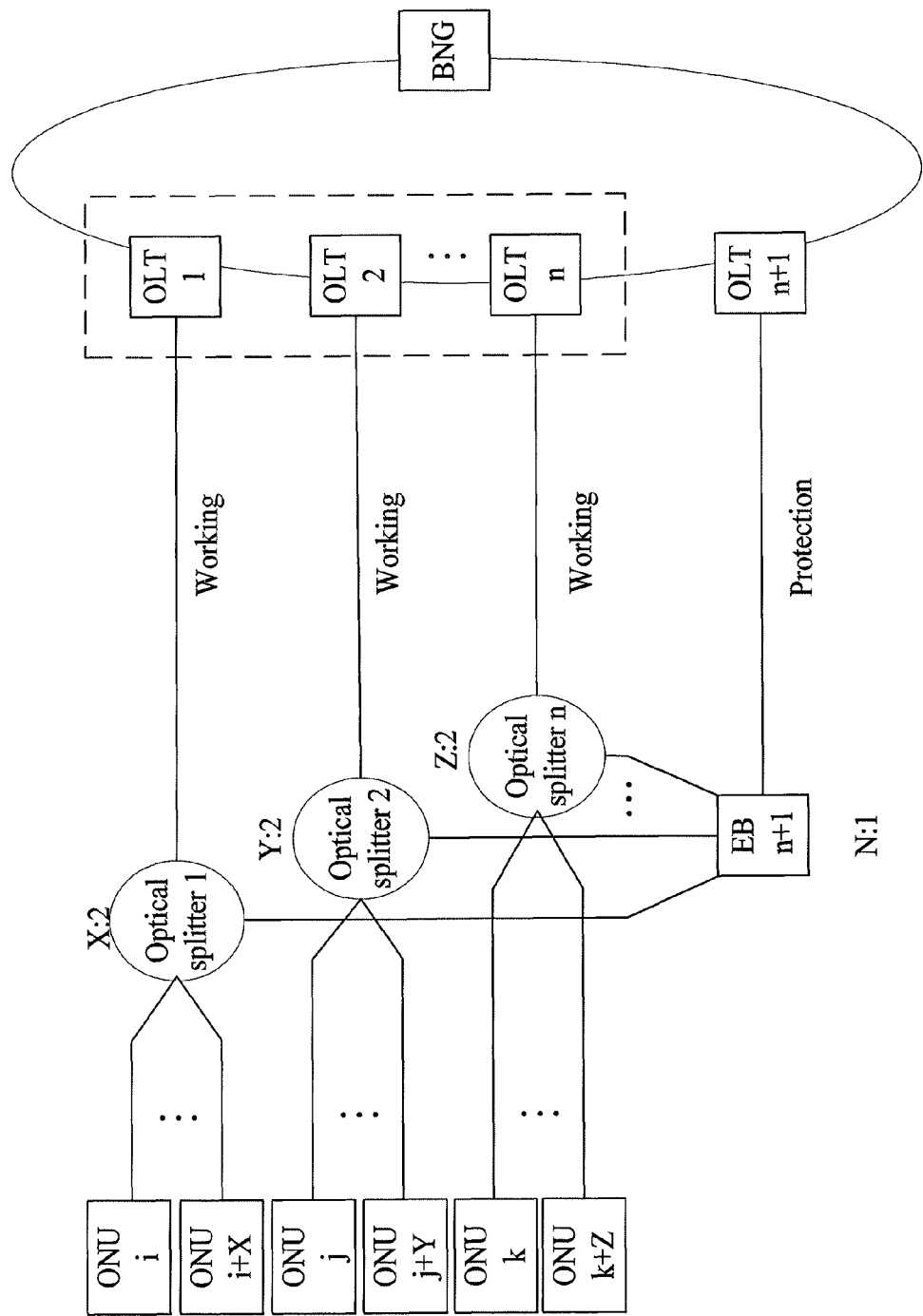
FIG. 3 (*a*) and FIG. 3 (*b*) are schematic network architecture diagrams applied in the first embodiment of the present application.
Figure 3:
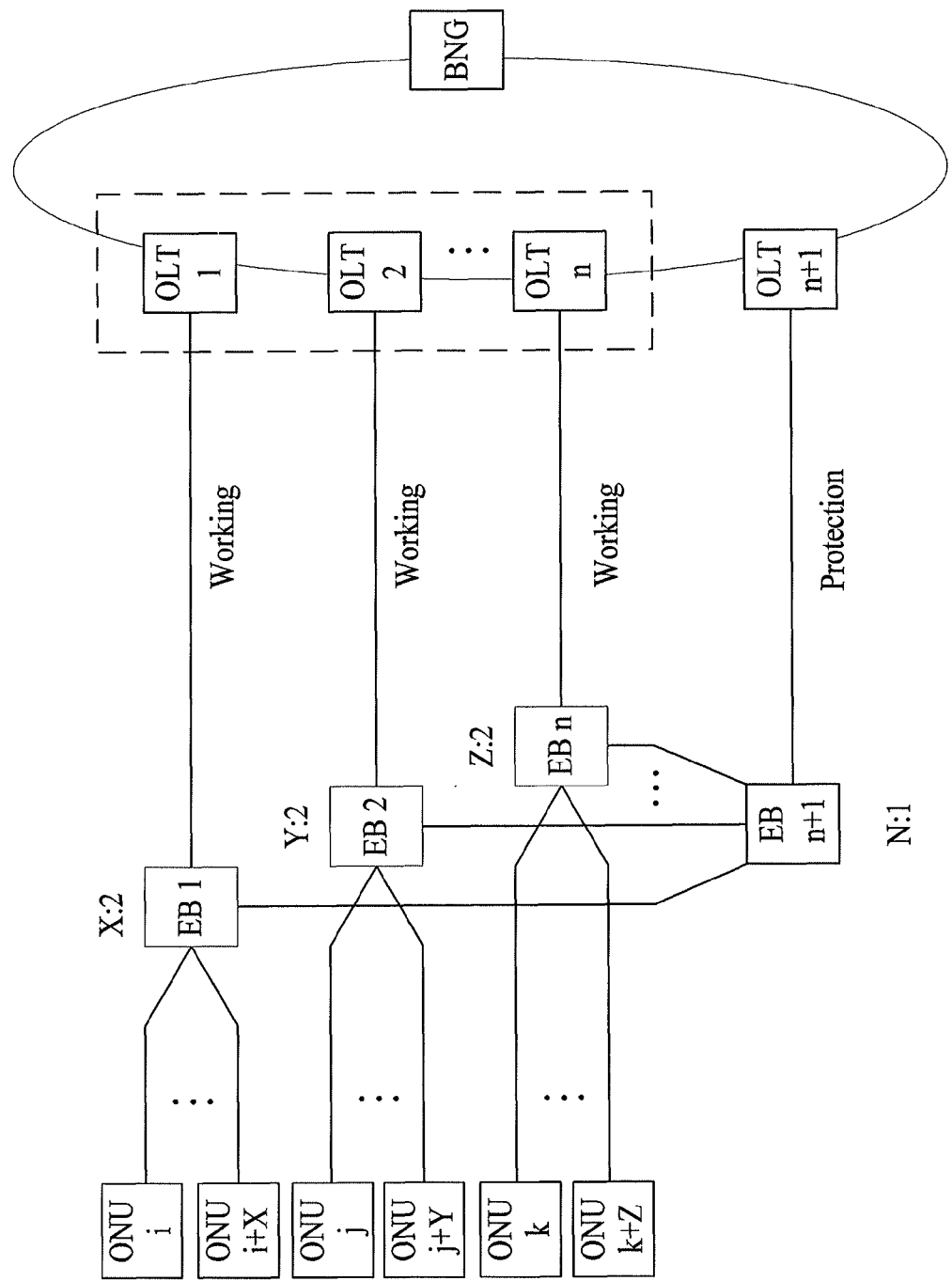

FIG. 3 is an example of the schematic network architecture diagram applied in the first embodiment of the present application. Because multiple working OLTs are protected by one protection OLT, the mode is called N+1 or N:1 protection. In embodiments of the present application, the switchover control device may be implemented by improving an existing EB. By adding interfaces connecting to interfaces of other working optical links and switchover control functions to the existing EB, a protection OLT can protect multiple working OLTs.

In FIG. 3 (a), the OLT1-OLTn are n working OLTs, and the OLTn+1 is a protection OLT for protecting the n working OLTs. Each working OLT is connected to multiple corresponding ONUs through optical splitters. As shown in FIG. 3, the OLT1 corresponds to x ONUs, the OLT2 corresponds to y ONUs, and the OLT3 corresponds to z ONUs. The OLT1-OLTn may use different PON modes. For example, the OLT1 uses the gigabit passive optical network (GPON) or Ethernet passive optical network (EPON) mode, while the OLT2 uses the next-generation GPON or EPON mode.

The EBn+1 is an improved special EB, and may support the following features: N PON working paths share the same PON protection path; N working OLTs share the same protection OLT (OLT n+1 shown in FIG. 2); and N feeder fibers share the same protection feeder fiber. The working OLT and the protection OLT are connected to the BNG. The working OLT and the protection OLT may be connected to each other (for example, using wavelength division multiplexing (WDM) devices to constitute an OLT ring network).

In practical application, the optical splitter in FIG. 3 may be replaced by an EB with the same function, as shown in FIG. 3 (b), where the OLT1-OLTn and even OLTn+1 may be implemented in one OLT physical device, for example, the OLT1-OLTn working plug-in cards share the same OLTn+1 protection plug-in card.

Figure 4:
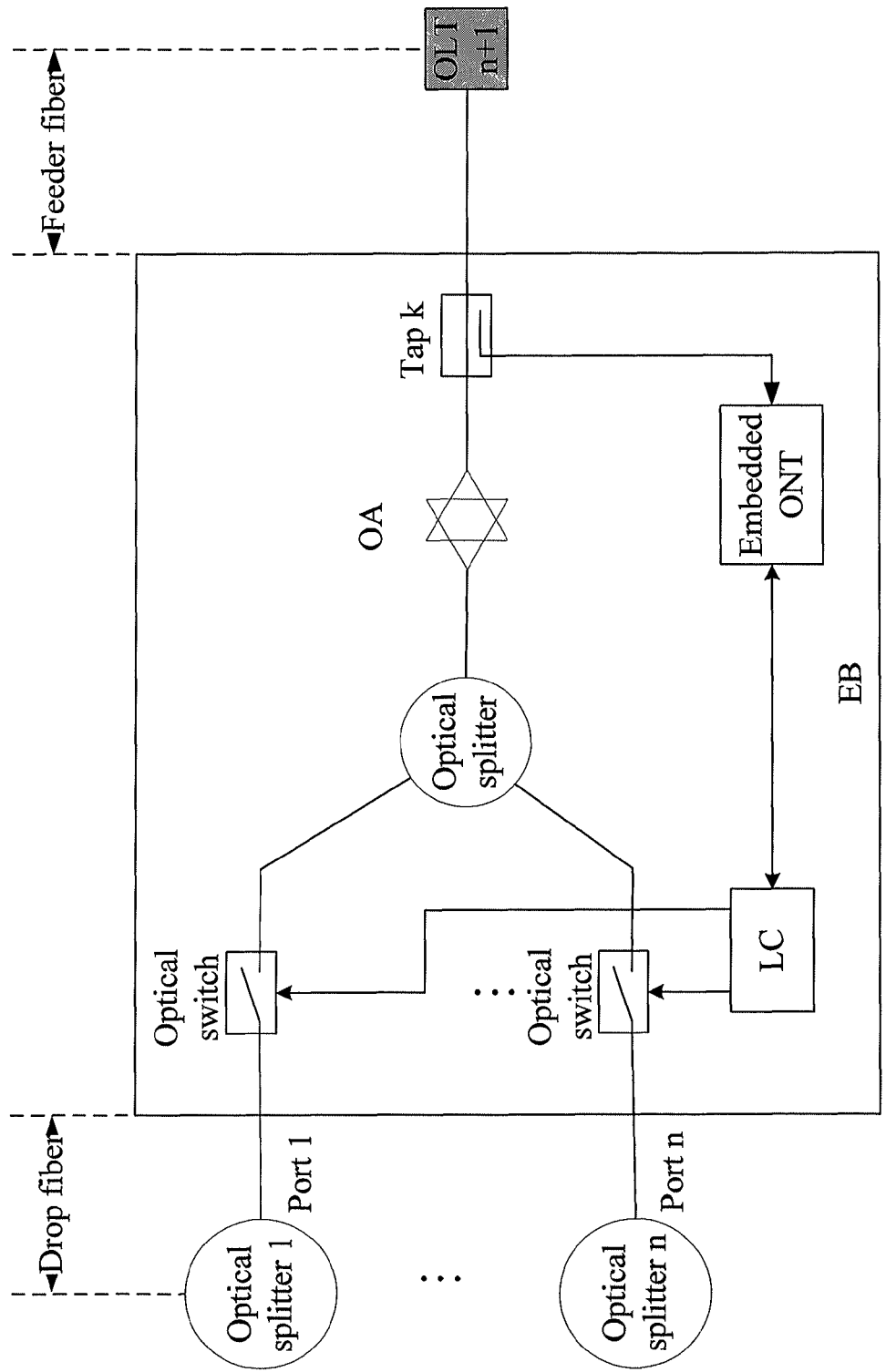
FIG. 4 (*a*), FIG. 4 (*b*), FIG. 4 (*c*), and FIG. 4 (*d*) are schematic structure diagrams of improved EBs according to the first embodiment of the present application.
Figure 4:
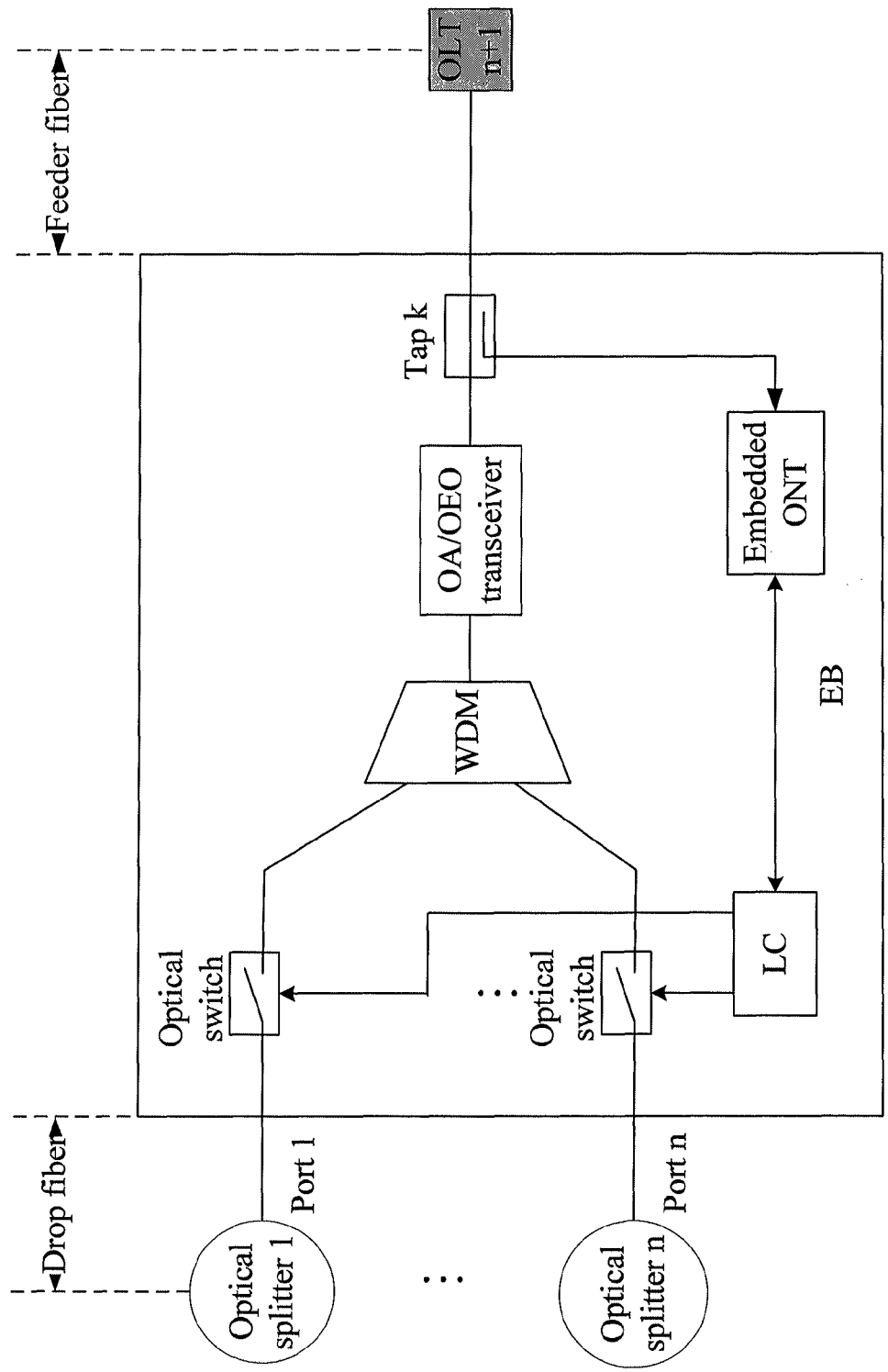
Figure 4:
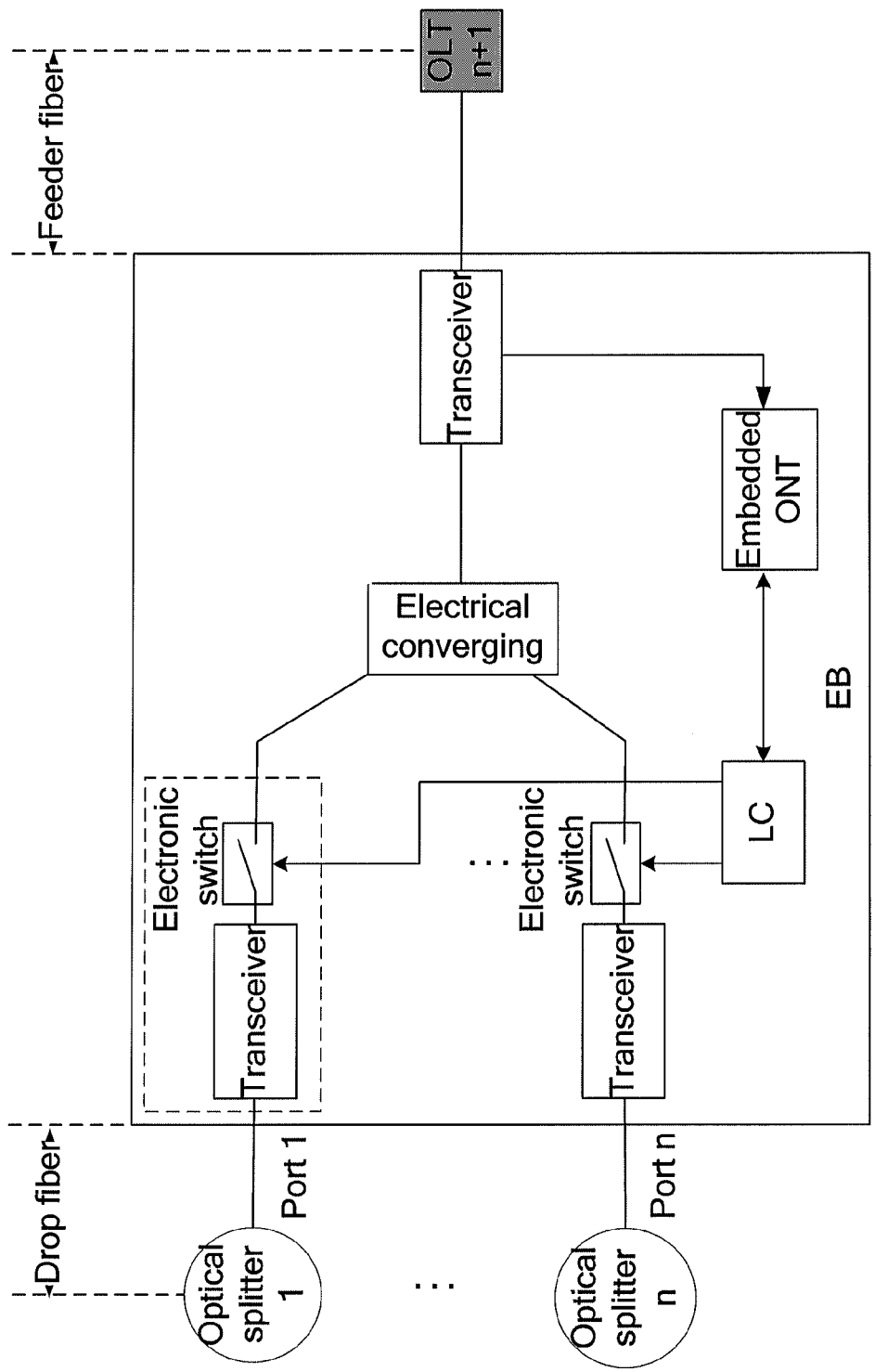
Figure 4:
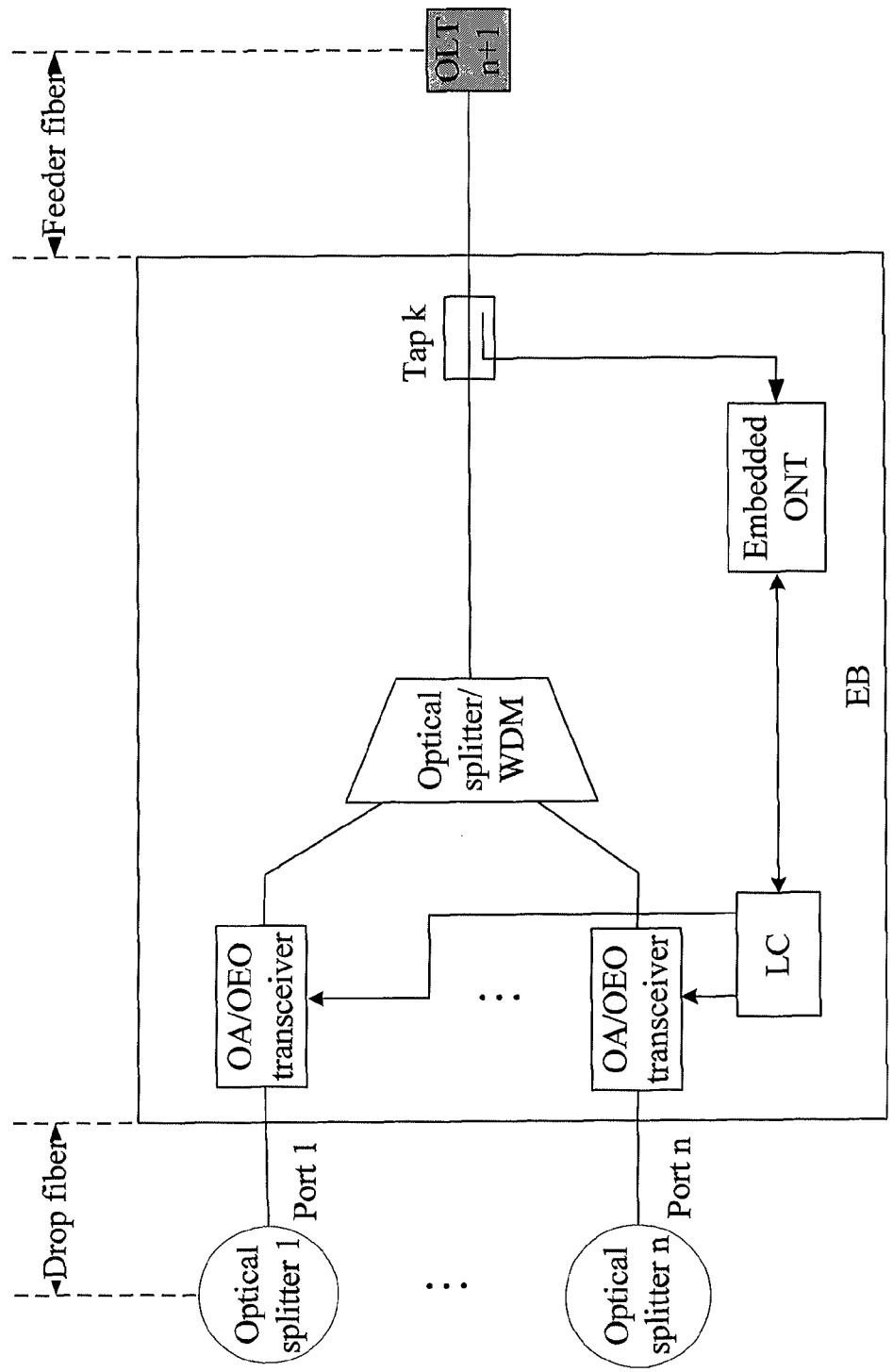

FIG. 4 (a), FIG. 4 (b), FIG. 4 (c), and FIG. 4 (d) are schematic structure diagrams of improved special EBs. In FIG. 4 (a), the improved special EB includes: an optical switch, a tap, an optical splitter, an embedded ONT, a local controller (LC), and an optical amplifier (OA). Usually, the uplink needs to be separated from the downlink. For the specific EB structure, see FIG. 11 (a).

The tap is configured to split a small part of light from the optical channel and send it to the embedded ONT.

The embedded ONT is configured to communicate with the OLTn+1 and control an optical switch. In this embodiment, an ONT is embedded in the EB to serve as a control device, and other apparatuses with similar functions may also be used to control the optical switch. The choice of the specific apparatus does not constitute a limitation on the present application. For example, an independent LC may be introduced to separate the function of controlling the optical switch from the embedded ONT, and the embedded ONT is mainly configured to communicate with the OLTn+1.

The normal state of the optical switch is disconnected. When it is determined that the $m^{th}$ feeder fiber or working OLTm fails, the optical switch corresponding to port m is connected. In this embodiment, the optical switch may also be a mechanical switch or an electronic switch.

The OA is configured to amplify received optical signals. When the number of feeder fibers of the faulty working OLTs increases, the number of ONUs taken over by the OLTn+1 increases accordingly. The OLTn+1 may adjust the corresponding OA power amplification coefficient of the EBn+1 through the embedded ONT, or the EBn+1 needs to adaptively adjust the corresponding OA power amplification coefficient, so that the protection optical link after the switchover may take over the working OLT perfectly.

The optical splitter is configured to converge multiple optical signals into one optical signal, or split one optical signal into multiple optical signals.

In FIG. 4 (a), because the ONU uplink and downlink optical signals have the same wavelengths, the optical splitter may be used. In the case that the wavelengths of the ONU uplink and downlink optical signals are different, by referring to FIG. 4 (b), a wavelength division multiplexing (WDM) device is used to replace the optical splitter. An optical-electrical-optical (OEO) transceiver may be used to replace the OA or the OA is directly used. If the ONU and OLT use different wavelengths, wavelength conversion needs to be performed in the EB. Usually, the uplink needs to be separated from the downlink. For the specific EB structure, refer to FIG. 11 (a) FIG. 11 (b).

The OEO transceiver is configured to: convert received optical signals into electrical signals, process the electrical signals, convert the processed electrical signals into new optical signals, and forward the new optical signals. When the number of feeder fibers of the faulty working OLTs increases, the number of ONUs taken over by the OLTn+1 increases accordingly. The OLTn+1 adjusts the corresponding OEO power amplification efficient of the EBn+1 through the embedded ONT, or the EBn+1 needs to adaptively adjust the corresponding OEO power amplification efficient, so that the protection optical link after the switchover may take over the working OLT perfectly.

FIG. 4 (c) differs from FIG. 4 (a) and FIG. 4 (b) in that: optical signals are converted into electrical signals first, and then the electrical signals are converged/diverged and finally converted into optical signals. By using the OEO architecture, a circuit switch (such as a switch metal oxide semiconductor (MOS) and a switch transistor) may be used to enable or disable the protection link, so that the system may easily control the connection or disconnection of the link.

As shown in FIG. 4 (c), the improved EB includes: an electrical converging module, an electronic switch, an embedded ONT, a local controller (LC), and a transceiver. Usually, the uplink needs to be separated from the downlink. For the specific EB structure, refer to FIG. 11 (c).

The electrical converging module is configured to diverge and converge electrical signals and includes two types. The first type of electrical converging module is equivalent to an electrical splitter, and it diverges or splits downlink electrical signals, and converges or combines uplink electrical signals. The first type of electrical converging module is similar to a pure optical splitter in functions, and may be called a virtual splitter. Specifically, it splits a downlink physical signal of the PON into multiple identical downlink physical signals in the electrical domain rather than the optical domain, and superimposes and combines multiple uplink physical signals of the PON into one uplink physical signal. The second type of electrical converging module is equivalent to a multiplexer (MUX)/demultiplexer (DeMUX), and demultiplexes downlink electrical signals and multiplexes uplink electrical signals. For the second type of electrical converging module, the EB needs to communicate with the OLTn+1 through the embedded ONT or the LC by using the routing control function of the MUX/DeMUX.

The normal state of the electronic switch is disconnected. When it is determined that the $m^{th}$ feeder fiber or working OLTm fails, the electronic switch corresponding to port m is connected. In this embodiment, the electronic switch may also be a mechanical switch. The electronic switch may be integrated with the transceiver, that is, the transceiver itself may have the switch function.

The transceiver is configured to convert received optical signals into electrical signals or convert electrical signals into optical signals. When the number of faulty OLTs or feeder fibers increases, the number of ONUs taken over by the OLTn+1 increases accordingly. The OLTn+1 adjusts the transmit power of the corresponding transceiver of the EBn+1 through the embedded ONT, or the EBn+1 needs to adaptively adjust the transmission power of the corresponding transceiver, so that the protection optical link after the switchover may take over the working OLT perfectly. Transceivers of different ports may use different PON modes, for example, a port 1 uses the GPON or EPON mode, and a port 2 uses the next generation GPON or EPON mode.

In this embodiment, the switch for triggering the switchover is controlled by the embedded ONT. It is appreciated that the switch may also be controlled by the transceiver. Embodiments of the present application emphasize that the EB needs to include only a switchover control device which may implement a switchover at a proper time according to the obtained transmission status of the working optical link. The switchover control device may be set independently or integrated into devices such as an optical detector, a transceiver, and an embedded ONT. For example, an independent LC may be introduced to separate the function of controlling the switch from the embedded ONT, and the embedded ONT is mainly configured to communicate with OLTn+1.

FIG. 4 (d) differs from FIG. 4 (a) and FIG. 4 (b) in that: the optical switch is replaced with an OA or OEO transceiver at each ONU port, that is, the OA or OEO transceiver implements not only the OA or OEO function but also implements the switch function. Enabling or disabling of the OA or OEO transceiver is controlled by the embedded ONT. Other apparatuses with similar functions may also be used to control the optical switch. The choice of the specific apparatus does not constitute a limitation on the present application. For example, an independent LC may be introduced to separate the function of controlling the enabling or disabling of the OA or OEO transceiver from the embedded ONT, and the embedded ONT is mainly configured to communicate with OLTn+1. If the ONU and OLT use different wavelengths, wavelength conversion needs to be performed in the EB. OEO transceivers of different ports may use different PON modes, for example, a port 1 uses the GPON or EPON mode, and a port 2 uses the next generation GPON or EPON mode.

Usually, the uplink needs to be separated from the downlink. For the specific EB structure, refer to FIG. 11 (d) FIG. 11 (e).

Figure 5:
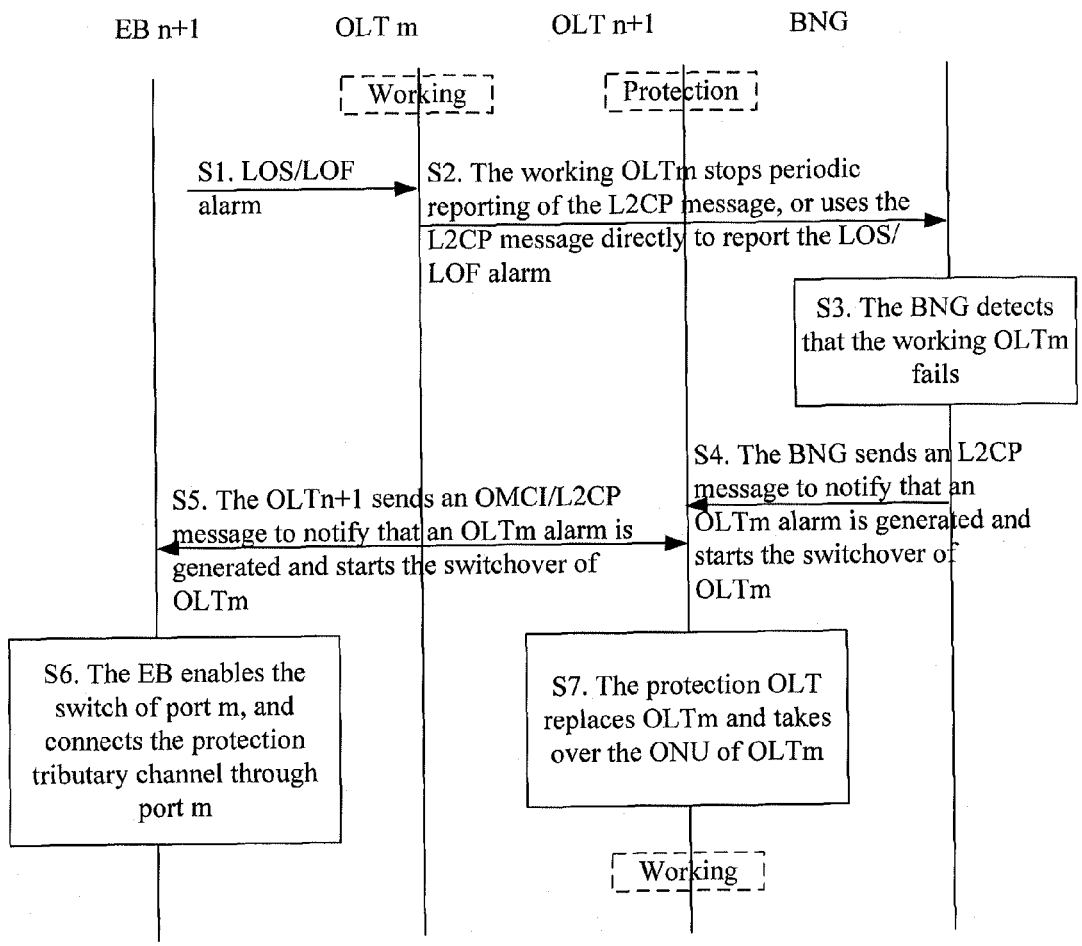
FIG. 5 is a flowchart of triggering a switchover through a management system or an Internet Protocol (IP) edge node according to an embodiment of the present application.
Figure 6:
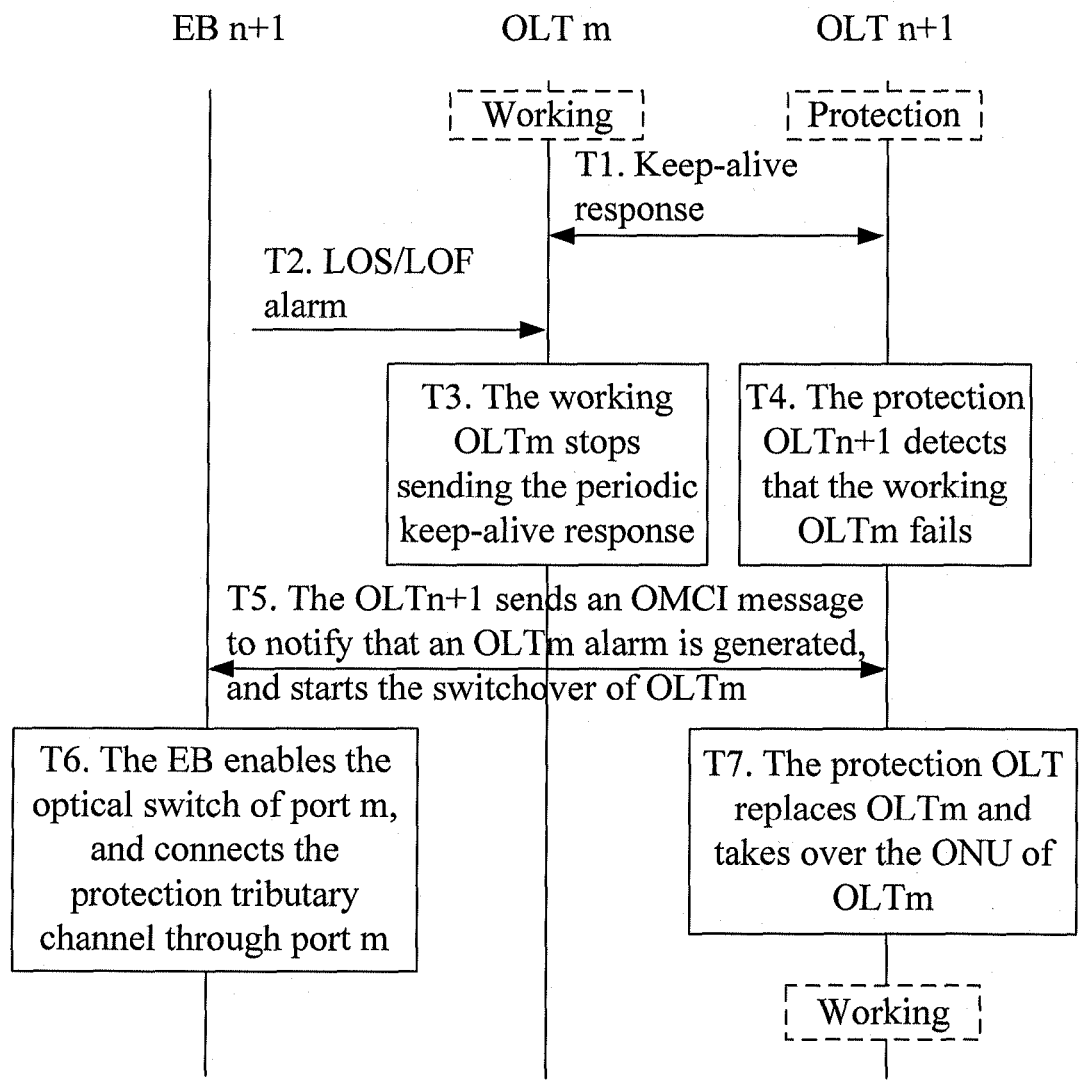
FIG. 6 is a flowchart of triggering a switchover by an OLT according to an embodiment of the present application.
Figure 7:
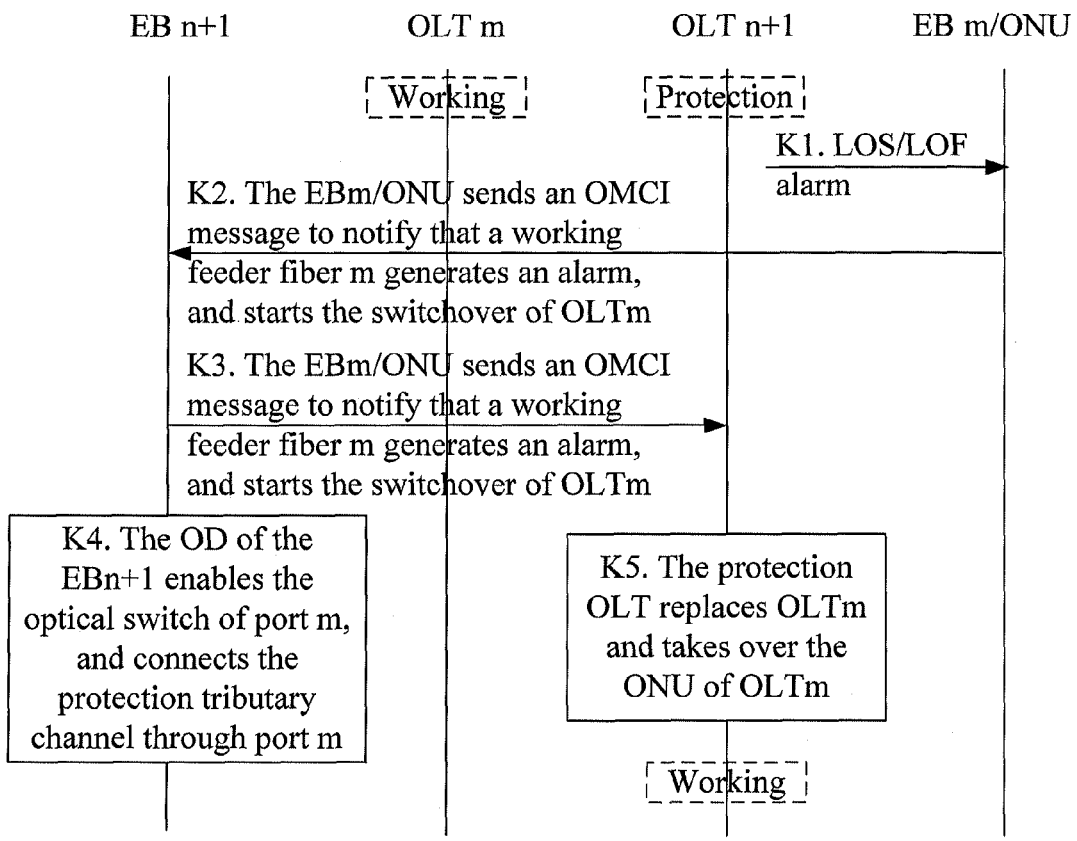
FIG. 7 is a flowchart of triggering a switchover through L2CP/OMCI according to an embodiment of the present application.

The following describes how the L2CP, OMCI, SNMP, or Ethernet OAM protocol is applied to perform a switchover according to the first embodiment, and the flowcharts are shown in FIG. 5, FIG. 6, and FIG. 7. L2CP is also called an Access Node Control Protocol (ANCP).

FIG. 5 is a flowchart of triggering a switchover through a management system or an IP edge node (such as a BNG/BRAS).

In this embodiment, when the working OLTm works normally, the optical switch of port m of the EB is disabled. The working OLTm reports an L2CP message or a keep-alive message to the BNG periodically, indicating the working OLTm or $m^{th}$ feeder fiber is normal. The process includes the following steps:

S1. When the $m^{th}$ feeder fiber fails, the working OLTm detects a loss of signal (LOS) or loss of frame (LOF) alarm.

S2. When the $m^{th}$ feeder fiber fails, the working OLTm may directly use an L2CP/Ethernet OAM message to report the LOS/LOF alarm to the BNG or stop reporting the L2CP/Ethernet OAM/keep-alive message such as bidirectional forwarding detection (BFD) to the BNG, indicating that the $m^{th}$ feeder fiber fails; when the working OLTm fails, the working OLTm stops reporting the L2CP/keep-alive message to the BNG periodically.

S3. The BNG determines that the $m^{th}$ feeder fiber fails or that the working OLTm fails because the BNG receives the LOS/LOF alarm reported in the L2CP/Ethernet OAM message or does not receive the periodic L2CP message/Ethernet OAM message/keep-alive message.

S4. The BNG uses the L2CP/Ethernet OAM message to notify the OLTn+1 that the working OLTm generates a LOS/LOF alarm or that the $m^{th}$ feeder fiber or working OLTm fails, or may directly instruct the OLTn+1 to start the switchover of the OLTm.

S5. The OLTn+1 uses the L2CP/OMCI/Ethernet OAM message to notify the EB that the working OLTm generates a LOS/LOF alarm or that the $m^{th}$ feeder fiber or working OLTm fails, or may directly instruct the EB to start the switchover of the OLTm.

S6. The EB enables the switch of port m, and connects the protection tributary channel through port m.

S7. The protection OLTn+1 replaces the OLTm and takes over the ONUs under all ports or faulty ports of the OLTm.

FIG. 6 is a flowchart of triggering a switchover by the OLT. In this embodiment, when the working OLTm works normally, the optical switch of port m of the EB is disabled. The specific process includes the following steps:

T1. The working OLTm sends a periodic keep-alive (such as BFD) response to the protection OLTn+1, indicating that the working OLT works normally.

T2. When the $m^{th}$ feeder fiber fails, the working OLTm detects a LOS/LOF alarm.

T3. When the $m^{th}$ feeder fiber fails or the working OLTm fails, the working OLTm stops sending the periodic keep-alive response.

T4. The protection OLTn+1 determines that the $m^{th}$ feeder fiber fails or that the working OLTm fails because no periodic keep-alive response is received.

T5. The OLTn+1 uses the L2CP/OMCI/Ethernet OAM message to notify the EB that the working OLTm generates an alarm or that the $m^{th}$ feeder fiber or working OLTm fails, or may directly instruct the EB to start the switchover of the OLTm.

T6. The EB enables the switch of port m, and connects the protection tributary channel through port m.

T7. The protection OLTn+1 replaces the OLTm and takes over the ONUs under all ports or faulty ports of the OLTm.

The following describes how the L2CP, OMCI, or Ethernet OAM protocol is applied to perform a switchover according to the first embodiment, and the flowchart is shown in FIG. 7. In this embodiment, when the working OLTm works normally, the optical switch of port m of the EB is disabled. The specific process includes the following steps:

K1. When the $m^{th}$ feeder fiber or the working OLTm fails, the working EBm/ONU of the working OLTm detects a LOS/LOF alarm.

K2. The working EBm or ONU of the working OLTm may directly use the OMCI/L2CP/Ethernet OAM message to report the LOS/LOF alarm to the EBn+1 or directly instruct the EBn+1 to start the switchover of the OLTm, indicating the $m^{th}$ feeder fiber or working OLTm fails.

K3. The EBn+1 transfers the OMCI/L2CP/Ethernet OAM message, and notifies the OLTn+1 through the embedded ONT that a LOS/LOF alarm is generated or that the $m^{th}$ feeder fiber or working OLTm fails, or may directly instruct the OLTn+1 to start the switchover of the OLTm.

K4. The OD of the EBn+1 determines that the $m^{th}$ feeder fiber or working OLTm fails because a LOS/LOF alarm reported in the OMCI/Ethernet OAM message or an OLTm switchover notification is received, and therefore enables the switch of port m, and connects the protection tributary channel through port m.

K5. The protection OLTn+1 replaces the OLTm and takes over the ONUs under all ports or faulty ports of the OLTm.

Embodiment 2

Figure 8:
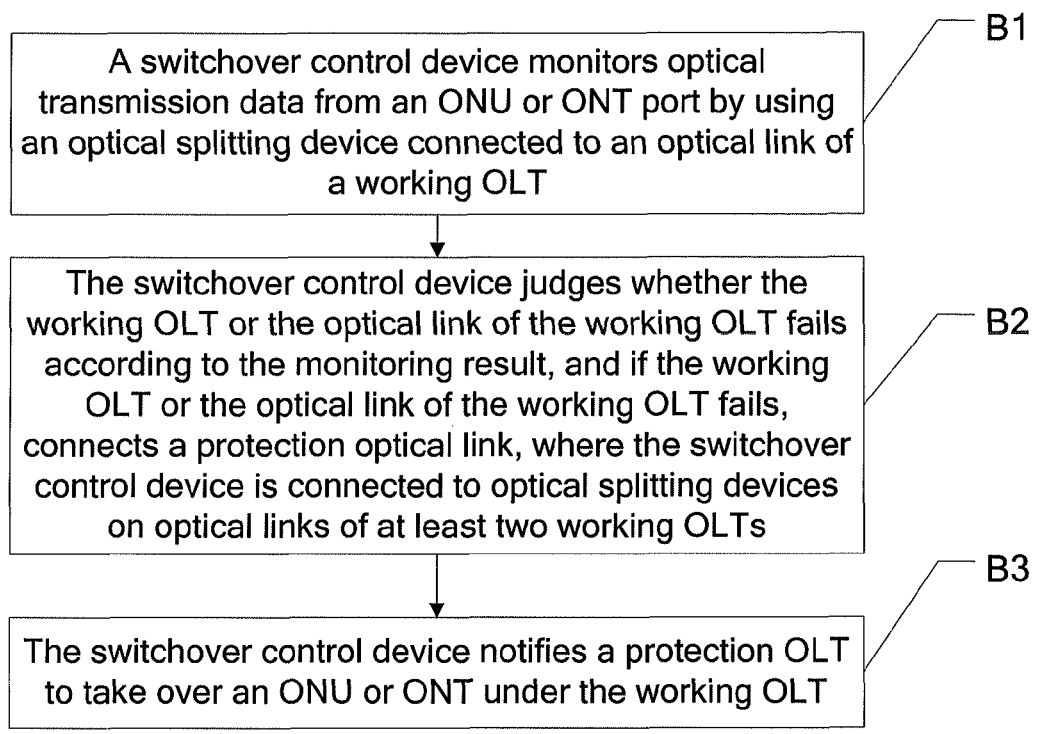
FIG. 8 is a flowchart of a PON protection method according to a second embodiment of the present application.

A PON protection method is provided. As shown in FIG. 8, the method includes the following steps:

B1. A switchover control device monitors optical transmission data from an ONU or ONT port by using an optical splitting device connected to an optical link of a working OLT.

In this embodiment, the switchover control device and the optical splitting device on the optical link of the working OLT are connected through an OD; the OD monitors the uplink optical transmission data from the ONU or ONT port through the optical splitting device connected to the optical link of the working OLT.

B2. The switchover control device determines whether the working OLT or the optical link of the working OLT fails according to the monitoring result, and if the working OLT or the optical link of the working OLT fails, a protection optical link is connected, where the switchover control device is connected to optical splitting devices on optical links of at least two working OLTs.

In this embodiment, if the switchover control device monitors no uplink transmission data within a preset time, the switchover control device judges whether the working OLT or the optical link of the working OLT fails.

B3. The switchover control device instructs a protection OLT to take over an ONU or ONT under the working OLT.

The second embodiment differs from the first embodiment in that: an apparatus for detecting the working optical link is added to the switchover control device; by detecting the uplink optical signals on the ONU port of the switchover control device, the status of the working optical link or working OLT may be obtained and a switchover is performed according to the status. In this embodiment, the switchover function may be implemented through improvement on the EB.

Figure 9:
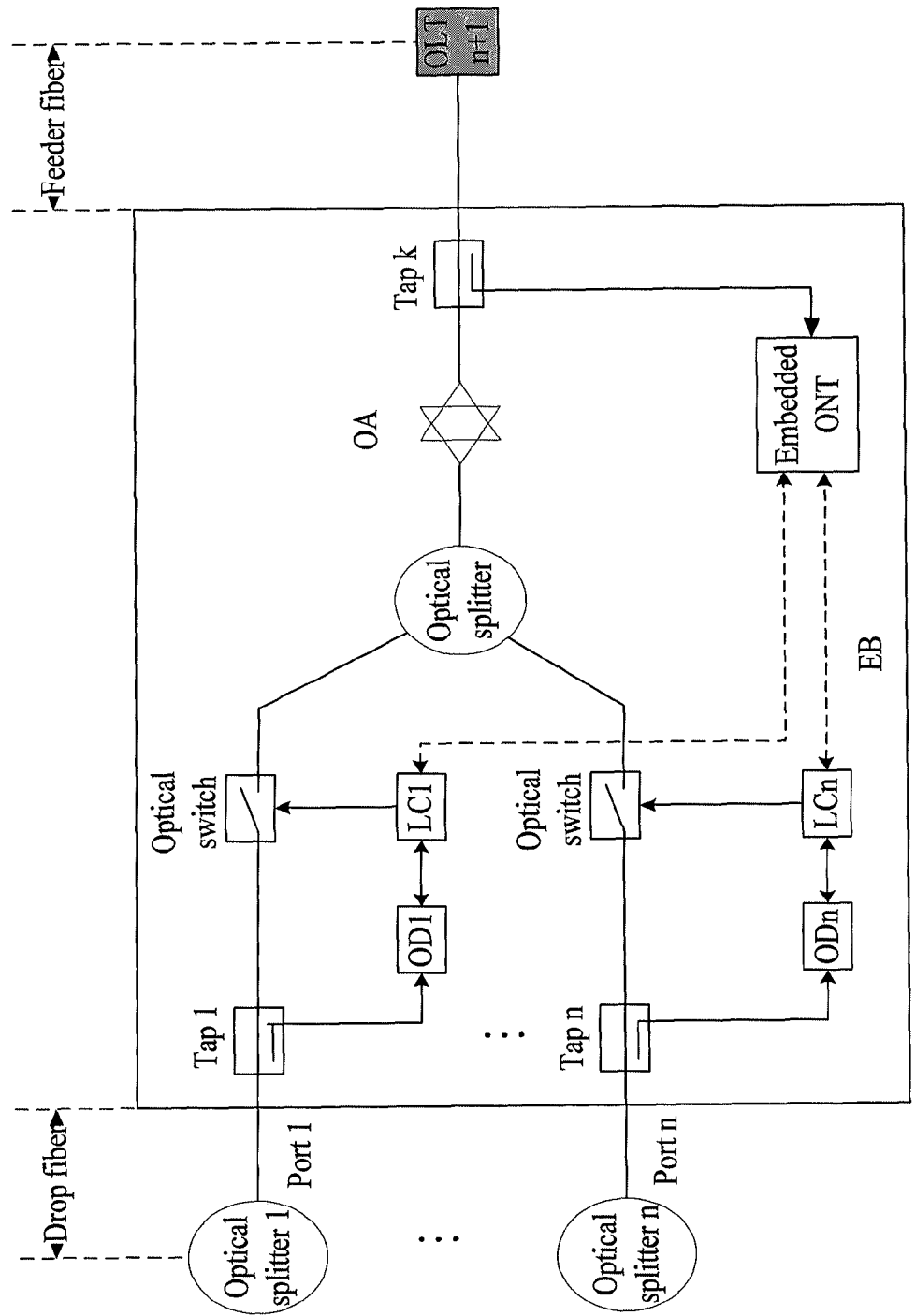
FIG. 9 (*a*), FIG. 9 (*b*), FIG. 9 (*c*), and FIG. 9 (*d*) are schematic structure diagrams of special EBs improved according to the second embodiment of the present application.
Figure 9:
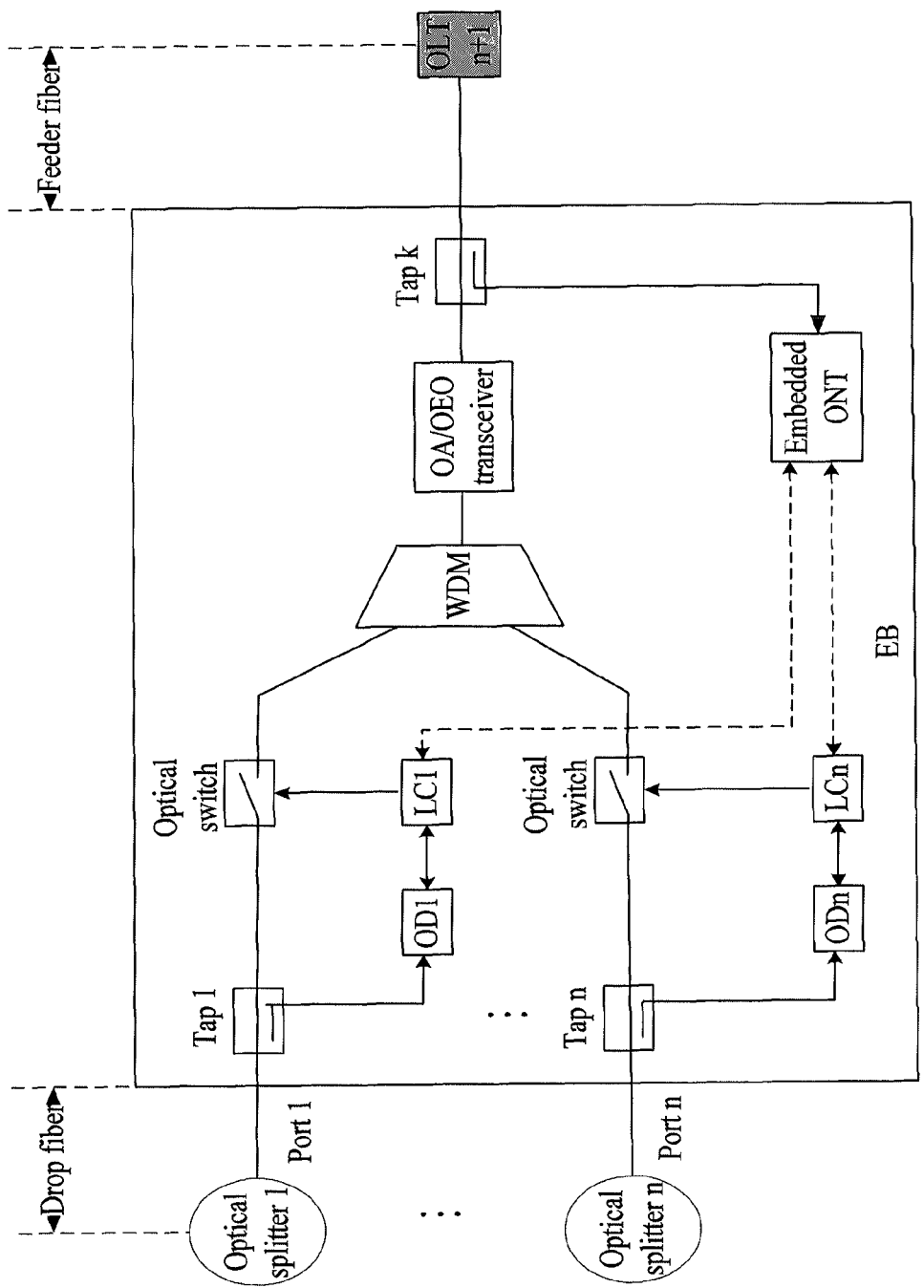
Figure 9:
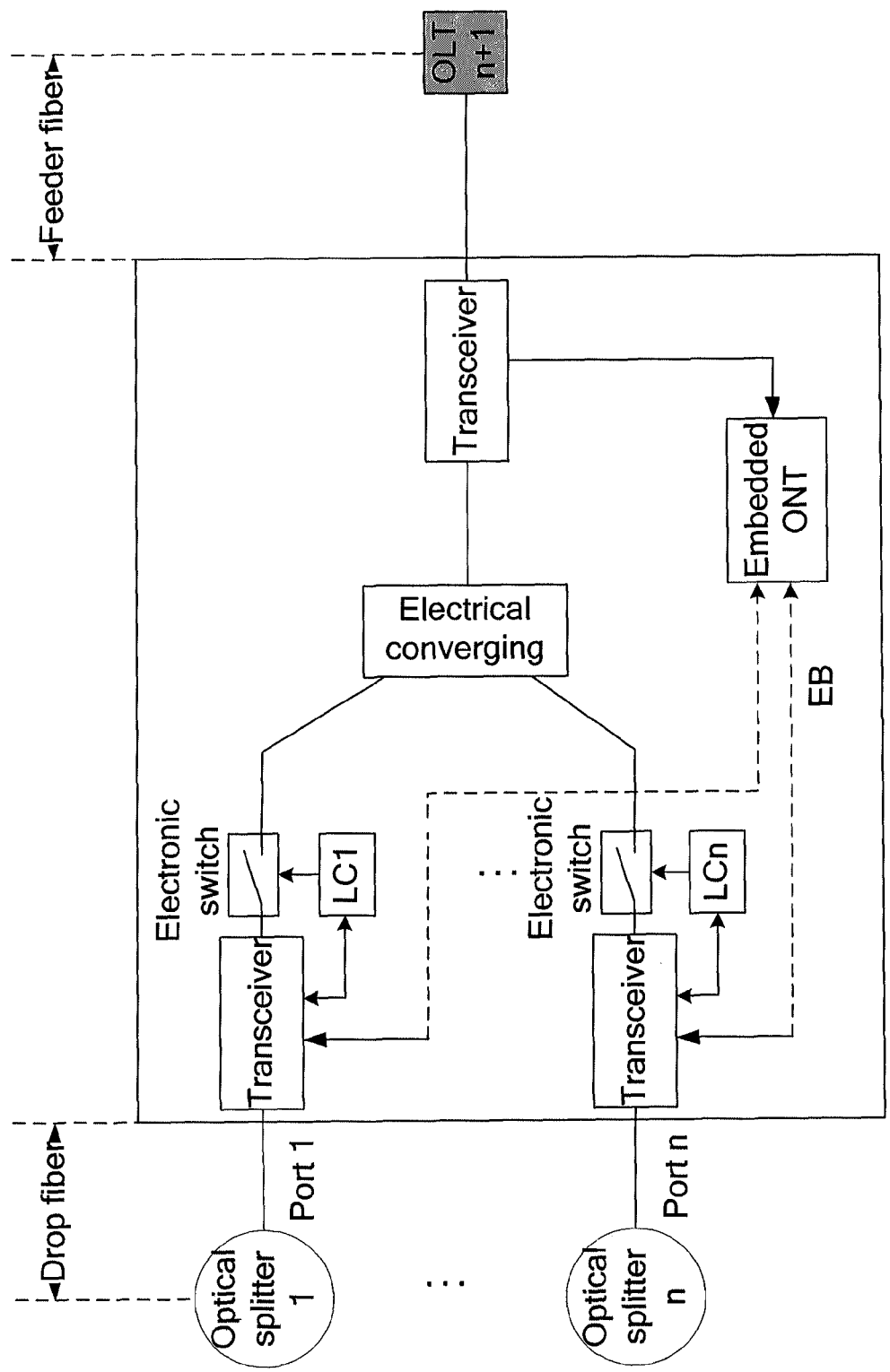
Figure 9:
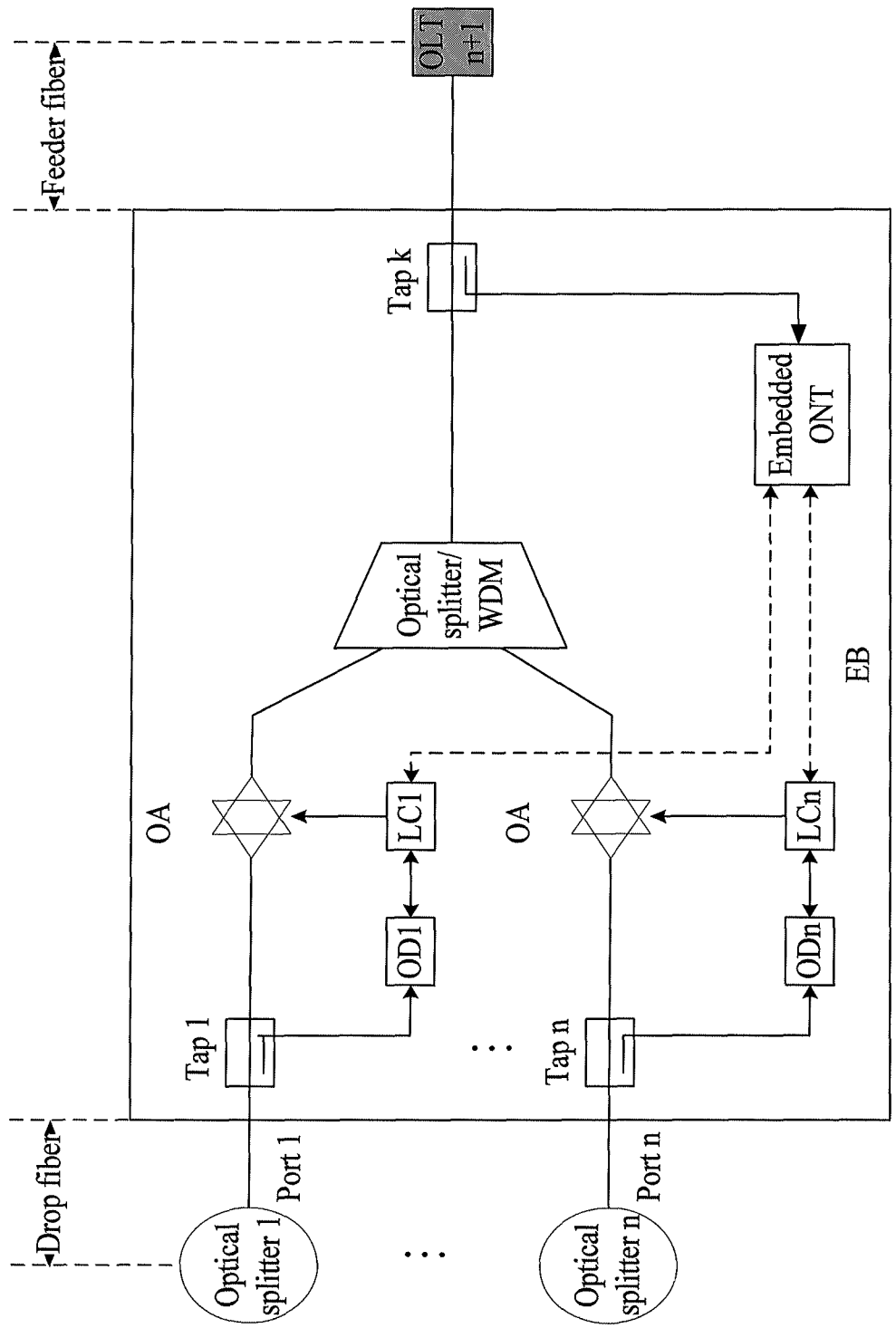

FIG. 9 (a), FIG. 9 (b), FIG. 9 (c), and FIG. 9 (d) are schematic structure diagrams of improved special EBs. The EB in FIG. 9 (a) includes: an OD, an optical switch, a tap, an optical splitter, an embedded ONT, an LC, and an OA or OEO transceiver.

The OD is equivalent to an OLT receiver, and is configured to detect uplink optical signals and parse uplink optical transmission data. The specific function is: monitoring uplink optical transmission data from the ONU port; if no uplink transmission data is monitored within a certain time, reporting to the OLT through the embedded ONT that the feeder fiber or working OLT at the corresponding port m may fail, and triggering to enable the optical switch directly or through the LC so as to connect the communication channel of the corresponding port.

In FIG. 9 (a), because the ONU uplink and downlink optical signals have the same wavelengths, the optical splitter may be used. In the case that the ONU uplink and downlink optical signals have different wavelengths, by referring to FIG. 9 (b), a WDM device is used to replace the optical splitter. An OEO transceiver may be used to replace the OA or the OA is directly used. If the ONU and OLT use different wavelengths, wavelength conversion needs to be performed in the EB. Usually, the uplink needs to be separated from the downlink. For the specific EB structure, refer to FIG. 11 (a) FIG. 11 (b).

For functions of the optical switch, tap, optical splitter, embedded ONT, LC, OA or OEO transceiver, WDM device, and OEO transceiver, refer to descriptions in the first embodiment.

In FIG. 9 (c), the improved EB includes: an electrical converging module, an electronic switch, an embedded ONT, an LC, and a transceiver. Usually, the uplink needs to be separated from the downlink. For the specific EB structure, refer to FIG. 11 (c).

Transceivers of different ports may use different PON modes, for example, a port 1 uses the GPON or EPON mode, and a port 2 uses the next generation GPON or EPON mode.

For basic functions of the electrical converging module and transceiver, refer to descriptions of FIG. 4 (c) in the first embodiment. The difference is that: in this embodiment, the transceiver needs to monitor the data, which is transmitted on the working optical link, through interfaces, and according to the monitoring result, control the disabling or enabling of the switch directly or through the LC to implement a switchover. The embedded ONT may also control the disabling or enabling of the switch according to the monitoring result of the transceiver; in this case, the transceiver needs to feed back the monitoring result to the embedded ONT.

FIG. 9 (d) differs from FIG. 9 (a) in that: the optical switch is replaced with an OA at each ONU port, that is, the OA implements both the OA function and the switch function. Enabling or disabling of the OA is controlled by the embedded ONT. Other apparatuses with similar functions may also be used to control the optical switch. The choice of the specific apparatus does not constitute a limitation on the present application. For example, an independent LC may be introduced to separate the function of controlling the enabling or disabling of the OA from the embedded ONT, and the embedded ONT is mainly configured to communicate with the OLTn+1. OEO transceivers of different ports may use different PON modes, for example, a port 1 uses the GPON or EPON mode, and a port 2 uses the next generation GPON or EPON mode. If the ONU and OLT use different wavelengths, wavelength conversion needs to be performed in the EB. Usually, the uplink needs to be separated from the downlink. For the specific EB structure, refer to FIG. 11 (d).

Embodiment 3

A PON protection method is provided. The method in this embodiment differs from the method in the second embodiment in that:

After the protection optical link is connected, the protection OLT is switched over to the working OLT to take over the ONU or ONT under the working OLT. Before this step, the method further includes the following steps:

The protection OLT enables a laser, and attempts to set up a communication connection with the ONU or ONT.

The switchover control device judges whether the detector monitors the uplink transmission data of the ONU or ONT within a preset time; if the detector monitors the uplink transmission data of the ONU or ONT within a preset time, the switchover control device continues the step of switching over the protection OLT to the working OLT to make the protection OLT take over the ONU or ONT under the working OLT. If the detector monitors no uplink transmission data of the ONU or ONT within a preset time, the protection OLT disables the laser, and gives up the communication connection with the ONU or ONT.

In addition, after the protection OLT is switched over to the working OLT and takes over the ONU or ONT under the working OLT, the method further includes the following steps: judge whether abnormally emitted light occupies the uplink channel, and if abnormally emitted light occupies the uplink channel, turn off (disable) the uplink switch of the ONU or ONT.

The process of judging whether abnormally emitted light occupies the uplink channel may use the following mode:

the protection OLT instructs all ONUs or ONTs under the faulty port to stop sending uplink optical signals, and records the value of the total optical power;

if the value of the total optical power is 0, the protection OLT commands each ONU or ONT to send uplink optical signals; if the uplink signal of an ONU or ONT cannot be parsed, the protection OLT determines that the ONU or ONT emits light abnormally;

if the value of the total optical power is not 0, the protection OLT commands each ONU or ONT to send uplink optical signals, and then compares the former and latter values of total optical power; if no change occurs, the protection OLT determines that the ONU or ONT emits light abnormally.

Figure 10:
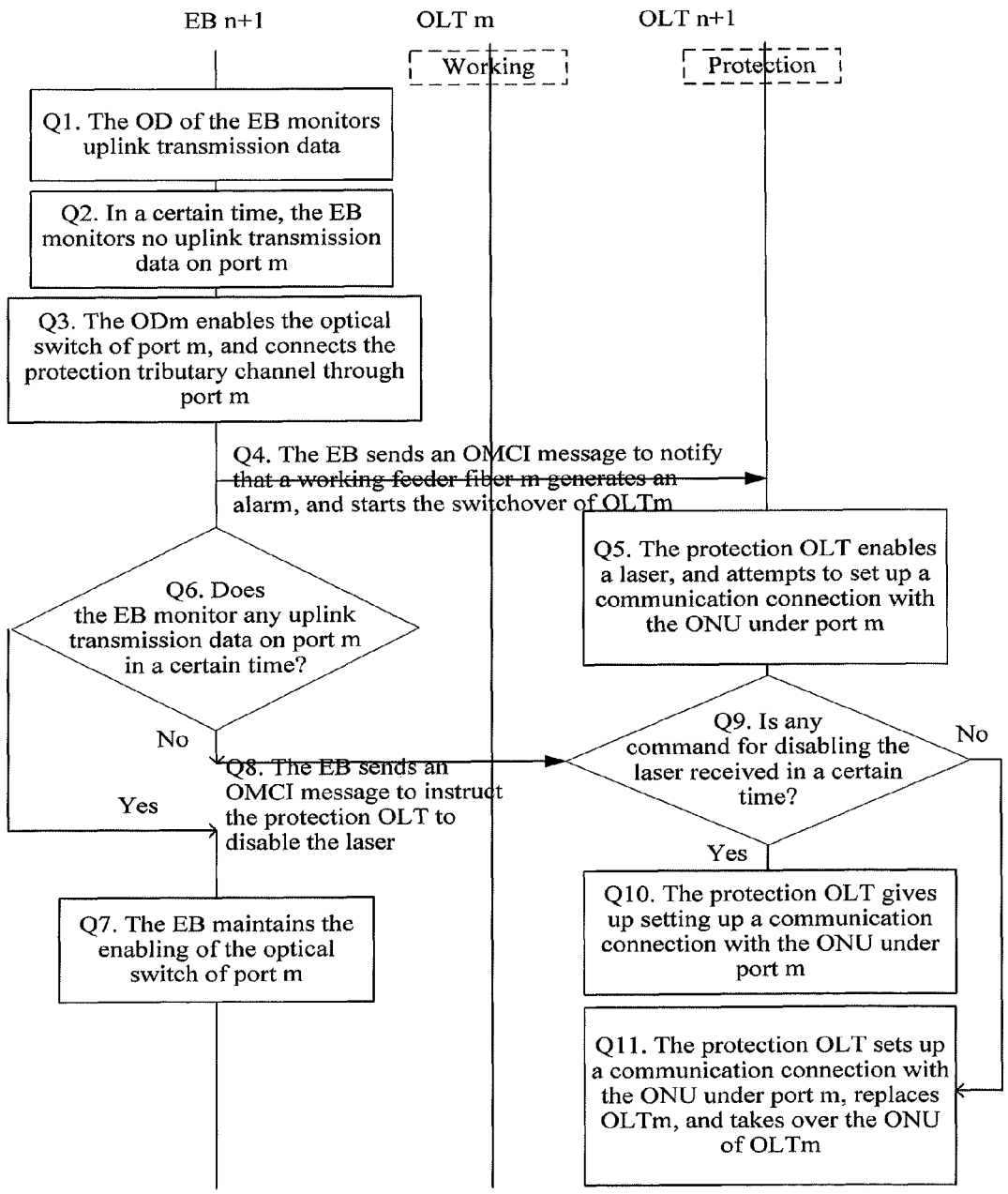
FIG. 10 is a flowchart of applying L2CP according to a method of a third embodiment.

The following describes the specific process of detecting the failure of a working link by an EB in the third embodiment. In this embodiment, when the working OLTm works normally, the optical switch of port m of the EB is disabled. As shown in FIG. 10, the process includes the following steps:

Q1. The OD of the EB monitors uplink transmission data on each port.

Q2. When the ONU detects a LOS/LOF alarm, the ONU changes to a POPUP state, immediately stops sending any uplink optical signal, and waits for the OLT to activate the ONU; therefore, if the ODm monitors no uplink transmission data on port m within a certain time, it is suspected that the $m^{th}$ feeder fiber or working OLTm fails.

Q3. The ODm triggers to enable the optical switch of port m directly or through the LCm, and connects the protection tributary channel through port m.

Q4. The EB reports to the OLT through the embedded ONT that the feeder fiber or working OLT at the corresponding port m may fail, or directly instructs the OLTn+1 to start the switchover of all ports/faulty ports of the OLTm.

Q5. The protection OLT enables a laser, and attempts to set up a communication connection with the ONU under port m.

Q6. The EB judges whether the ODm monitors uplink transmission data on port m within a certain time.

Q7. If the ODm monitors on port m uplink transmission data that the ONU sends in response to the OLTn+1 normally, it is regarded that the feeder fiber or working OLT indeed fails, and therefore the EB maintains the enabling of the optical switch of port m.

Q8. If the ODm monitors on port m no uplink transmission data that the ONU sends in response to the OLTn+1 normally, it is regarded that the feeder fiber or working OLT does not fail, and therefore the EB instructs the protection OLT to disable the laser through an OMCI/L2CP/Ethernet OAM message.

Q9. The OLTn+1 judges whether a command for disabling the laser is received within a certain time.

Q10. If the OLTn+1 receives the command for disabling the laser within a certain time, it is regarded that the feeder fiber or working OLT does not fail, and therefore the OLTn+1 disables the laser and gives up setting up a communication connection with the ONU under port m.

Q11. If the OLTn+1 receives no command for disabling the laser within a certain time, and the OLTn+1 successfully sets up a communication connection with the ONU under port m, it is determined that the feeder fiber or working OLT indeed fails. In this case, the OLTn+1 replaces the OLTm and takes over the ONUs under all ports or faulty ports of the OLTm.

The above specific process of detecting the failure of a working link by an EB is also applicable to the scenario of an optical switch.

Figure 11:
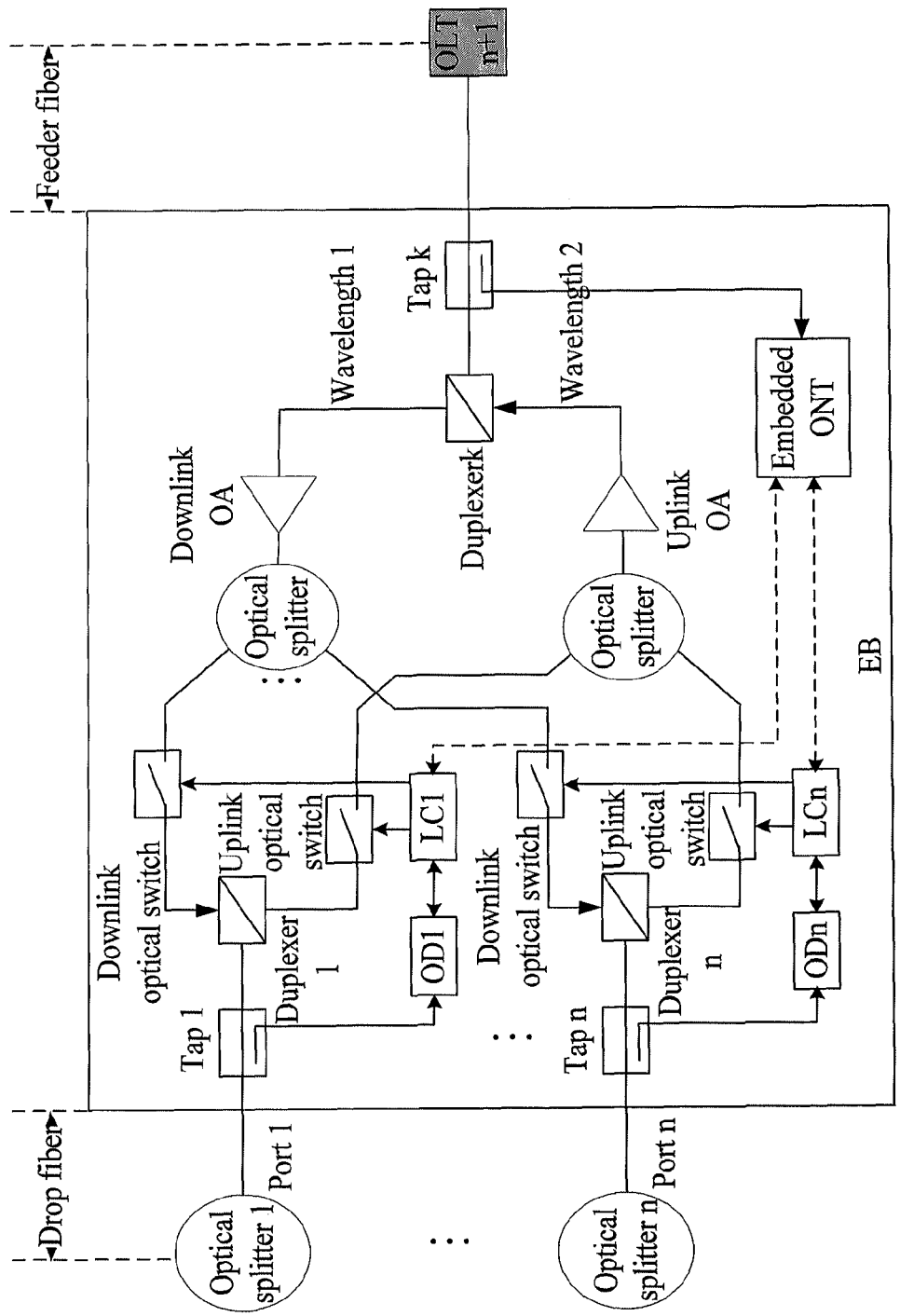
FIG. 11 (*a*), FIG. 11 (*b*), FIG. 11 (*c*), FIG. 11 (*d*), and FIG. 11 (*e*) are schematic structure diagrams of improved EBs according to an embodiment of the present application.
Figure 11:
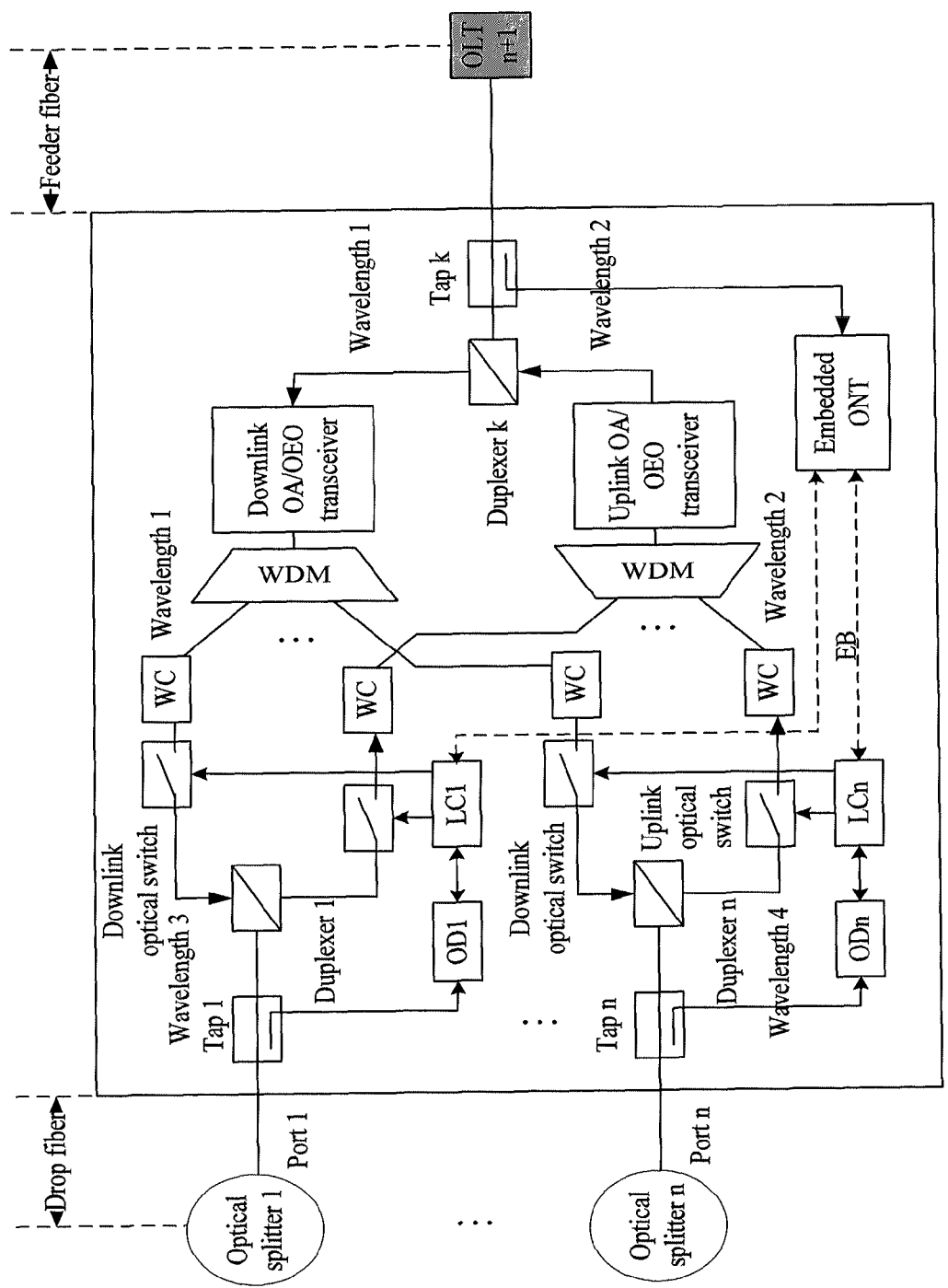
Figure 11:
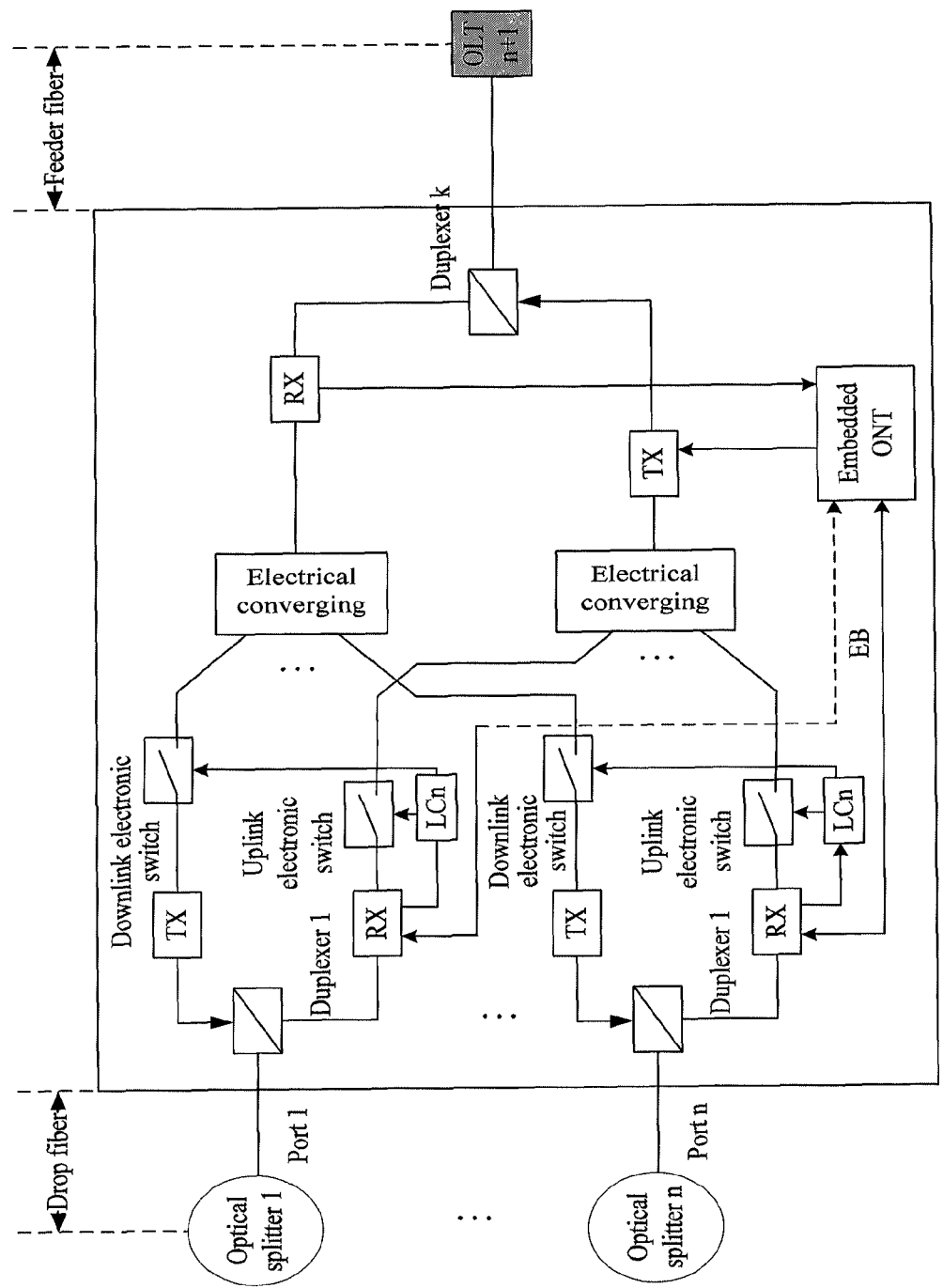
Figure 11:
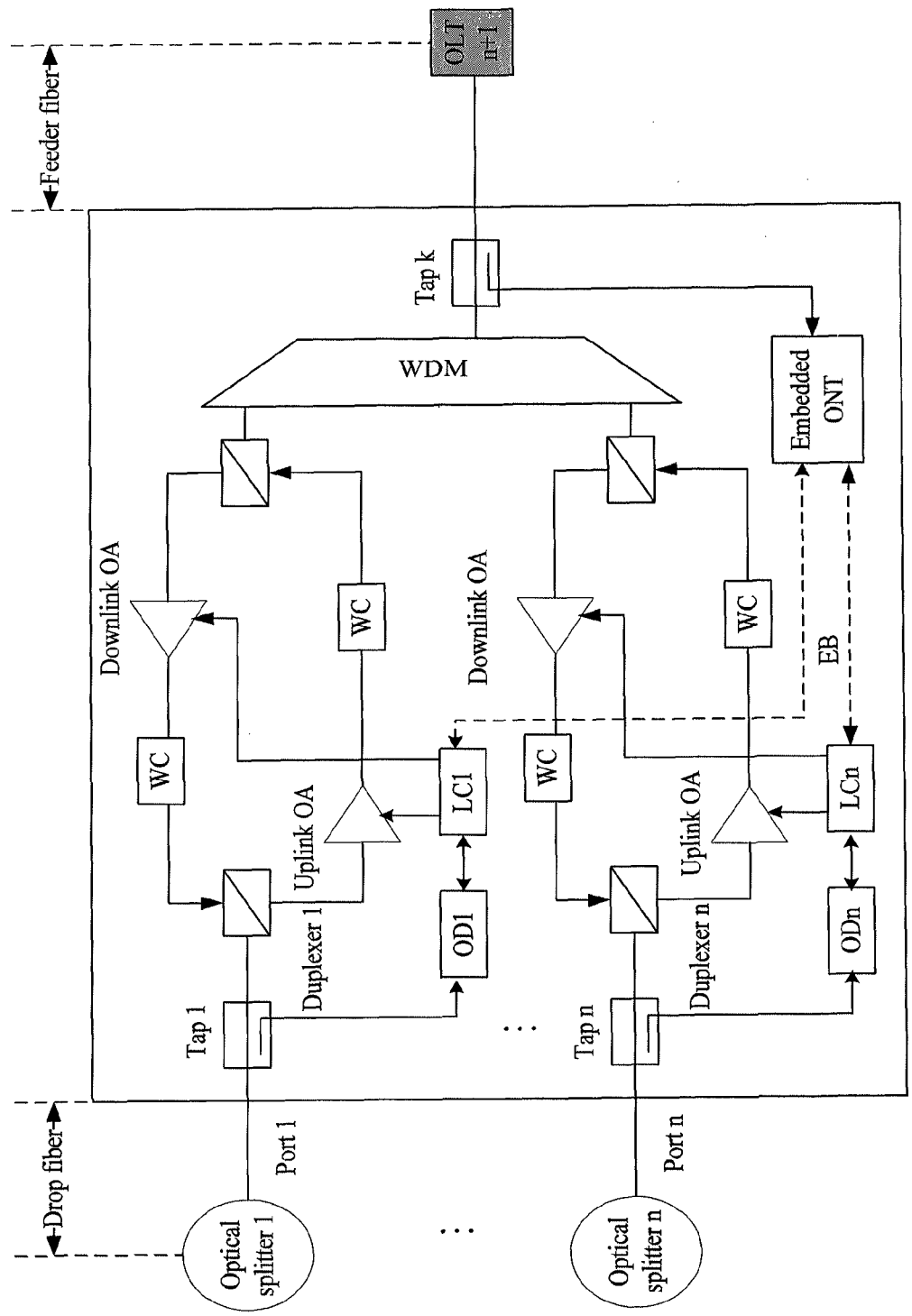
Figure 11:
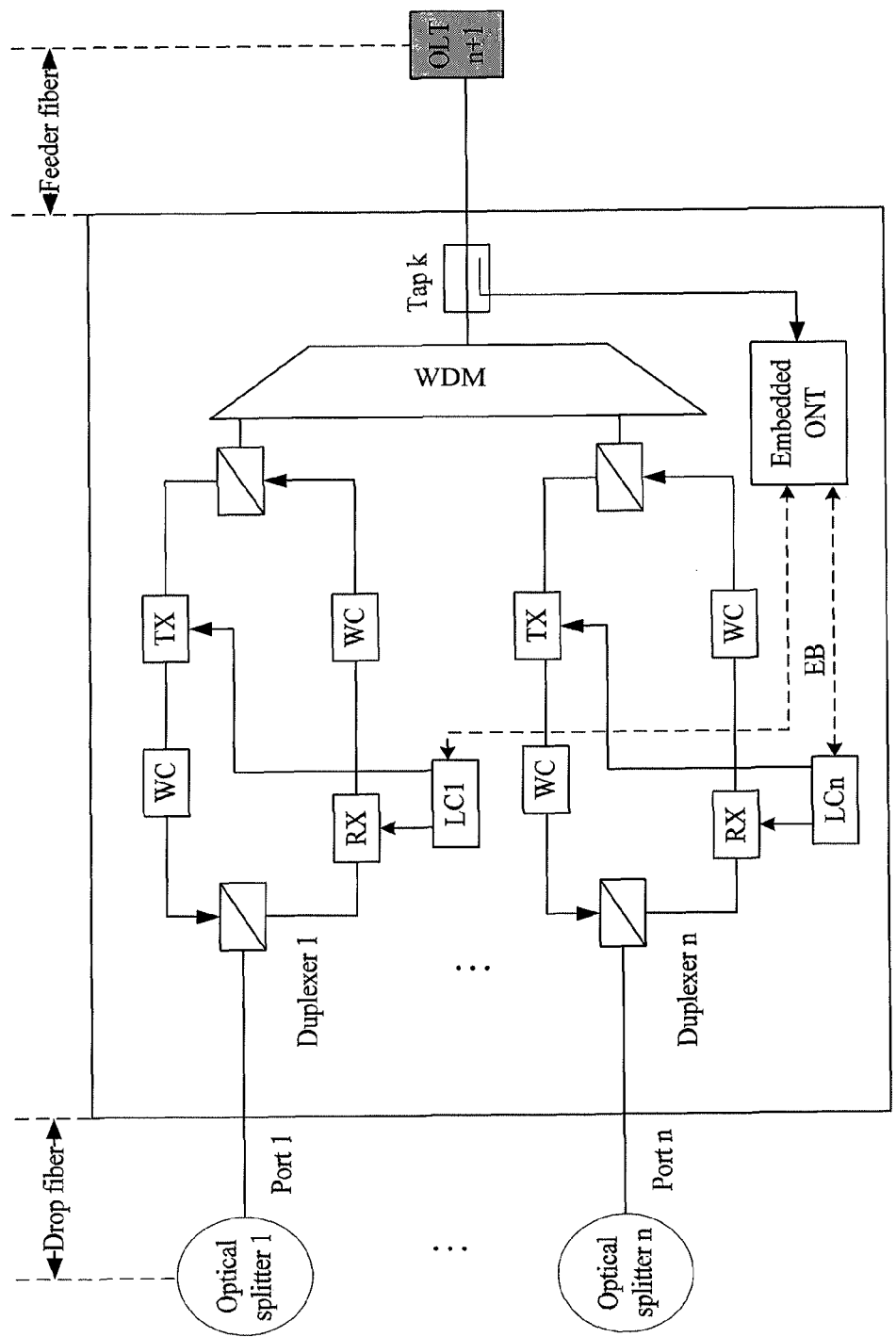

In order to make the protection EB control the uplink optical link and the downlink optical link separately, an embodiment of the present application provides an improved EB supporting PON protection. The functional block diagrams of the EB are shown in FIG. 11 (*a*), FIG. 11 (*b*), FIG. 11 (*c*), FIG. 11 (*d*), and FIG. 11 (*e*). In FIG. 11 (*a*) and FIG. 11 (*b*), on each PON port, the uplink is separated from the downlink, and an OD, a downlink optical switch, and a uplink optical switch are introduced. The whole EB includes a tap, an optical splitter/WDM device, an uplink optical switch, a downlink optical switch, an OD, an embedded ONT, an uplink OA or OEO transceiver, a downlink OA or OEO transceiver, an LC, and a duplexer. If the ONU and OLT use different wavelengths, wavelength conversion (WC) needs to be performed in the EB. The WC module is introduced in the uplink and downlink paths.

The duplexer is configured to implement single-fiber bidirectional transceiving, namely, combine the uplink and downlink into one.

The normal state of the uplink and downlink optical switches is disconnected. When it is determined that the $m^{th}$ feeder fiber or working OLTm fails, the uplink optical switch and downlink optical switch corresponding to port m are connected.

The OD is equivalent to an OLT receiver and is configured to detect uplink optical signals and parse uplink optical transmission data. The OD has the following functions:

1. Monitor the uplink optical transmission data from the ONU port; if no uplink transmission data is monitored on port m, report to the OLT through the embedded ONT that the feeder fiber or working OLT at the corresponding port m fails, trigger to enable the uplink and downlink optical switches, so as to connect the communication channel of the corresponding port.

2. Identify and detect the port with abnormal light emission, and parse the optical signals from the ONU port; if the optical signals cannot be normally parsed, determine that an ONU abnormally emits light under the port, and trigger to disable the uplink optical switch.

The switchover process based on the EB in FIG. 11 is similar to the switchover process based on the EBs in FIG. 4 and FIG. 9, and the only difference is that: in the switchover process based on the EB in FIG. 9, the uplink and downlink optical switches of port m are enabled or disabled simultaneously.

After the OLTn+1 replaces the OLTm and takes over the ONU of the OLTm, the ODm of the EB identifies and detects whether ONUs under port m include the ONU that emits light abnormally. The detection process is as follows:

The EB extracts a small part of light from each port m through tap m and detects the light through the ODm; when the ODm determines that the abnormally emitted light of the ONU under port m occupies the uplink channel, the ODm triggers to disable the uplink optical switch directly or through the LCm, and then reports the faulty port m to the OLT through the embedded ONT.

In this way, the uplink channel of the faulty port m is isolated in time, so as to ensure that the uplink channels of other ports are not affected and keeps the downlink channel of the faulty port m smooth (because the downlink optical switch is still enabled). Then the OLTn+1 may command all ONUs under the faulty port m to stop sending uplink optical signals, and record the value of the total optical power at this time. At this time, two cases exist: One case is that if the value of the total optical power is 0, step 1 is performed; the other case is that if the total optical power value is not 0, step 2 is performed.

1. Command ONUs one by one to send uplink optical signals; if the uplink signals of the $i^{th}$ ONU cannot be parsed, determine that the ONU emits light abnormally.

2. Command ONUs one by one to send uplink optical signals, and then compare the former and latter values of the total optical power; if no change occurs, determine that the ONU emits light abnormally; if a change occurs, command the ONU to stop sending uplink optical signals, and continue detecting the next ONU until the ONU that emits light abnormally is located.

FIG. 11 (*c*) differs from FIG. 11 (*b*) in that: optical signals are first converted into electrical signals, and after processed by the electrical converging unit, the signals are converted into optical signals and sent out, where:

the receiver (RX) is configured to convert received optical signals into electrical signals, and is equivalent to the OD; and the transmitter (TX) is configured to convert electrical signals into optical signals for sending; when the number of faulty OLTs or feeder fibers increases, the number of ONUs taken over by the OLTn+1 increases accordingly; the OLTn+1 needs to instruct the EBn+1 through the embedded ONT of the EBn+1 to adjust the transmit power of the corresponding TX, or the EBn+1 needs to adaptively adjust the transmit power of the corresponding TX.

The TX/RX of different ports may use different PON modes, for example, a port 1 uses the GPON or EPON mode, and a port 2 uses the next generation GPON or EPON mode.

FIG. 11 (*d*) and FIG. 11 (*e*) differ from FIG. 11 (*a*) and FIG. 4 (*b*) in that: the switch is replaced with an OA/TX/RX at each ONU port, that is, the OA/TX/RX implements both the OA/TX/RX function and the switch function. Enabling or disabling of the OA/TX/RX is controlled by the embedded ONT. Other apparatuses with similar functions may also be used to control the switch. The choice of the specific apparatus does not constitute a limitation on the present application. For example, an independent LC may be introduced to separate the function of controlling the enabling or disabling of the OA/TX/RX from the embedded ONT, and the embedded ONT is mainly configured to communicate with the OLTn+1. The TX/RX of different ports may use different PON modes, for example, a port 1 uses the GPON or EPON mode, and a port 2 uses the next generation GPON or EPON mode. If the ONU and OLT use different wavelengths, wavelength conversion (WC) needs to be performed in the EB. The wavelength conversion module is introduced in the uplink and downlink paths.

Persons having ordinary skill in the art may understand that all or part of the steps of the methods according to the embodiments of the present application may be implemented by a program instructing relevant hardware. The program may be stored in a computer readable storage medium, which can be a magnetic disk, a compact disk-read only memory (CD-ROM), a read only memory (ROM), or a random access memory (RAM).

Embodiment 4

Figure 12:
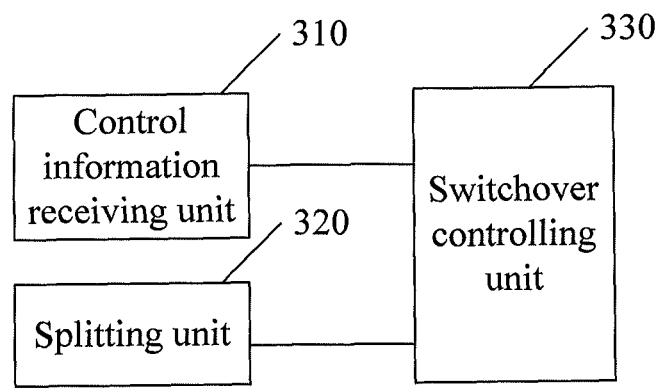
FIG. 12 is a schematic structure diagram of a switchover control device according to a fourth embodiment of the present application.

A switchover control device is provided. As shown in FIG. 12, the device includes:

a control information receiving unit 310, configured to receive a switchover request sent by a protection OLT or an ONU or EB under a working OLT, where the switchover request may carry information about a working OLT or optical link information of the working OLT;

a splitting unit 320, configured to connect to optical links of at least two working OLTs;

In this embodiment, the splitting unit is specifically configured to control the link between the splitting unit and the optical splitting device on the optical link of the working OLT by enabling the switch between the splitting unit and the optical splitting device on the optical link of the working OLT.

The splitting unit may be an optical splitter, an EB, a WDM device, or an electrical converging module. When the splitting unit is an electrical converging module, the electrical converging module is specifically configured to: split downlink electrical signals and combine uplink electrical signals, or demultiplex downlink electrical signals and multiplex uplink electrical signals; when the splitting unit is a WDM device, the WDM device is specifically configured to perform wavelength conversion when the ONU and OLT use different wavelengths.

a switchover controlling unit 330, configured to connect a protection optical link according to the information about the working OLT or optical link information of the working OLT after the control information receiving unit receives a switchover request, and instruct the protection OLT to take over the ONU or ONT under the working OLT;

It is understandable that the switchover control device may further include a power adjusting unit, which is configured to adjust a power amplification coefficient of the protection optical link and adjust transceiving signal power of the protection OLT.

Embodiment 5

Figure 13:
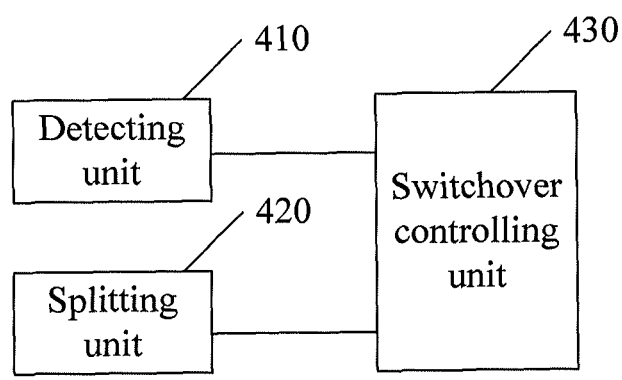
FIG. 13 is a schematic structure diagram of a switchover control device according to a fifth embodiment of the present application.

A switchover control device is provided. As shown in FIG. 13, the device includes:

a detecting unit 410, configured to: connect to an optical splitting device on an optical link of a working OLT, monitor an ONU port, and feed back the monitoring result to the switchover controlling unit. In this embodiment, the detecting unit may be an apparatus with the optical detection function such as an OD or a transceiver;

a splitting unit 420, configured to: connect to optical splitting devices on optical links of at least two working OLTs through switches, connect to a protection OLT to set up a protection optical link;

a switchover controlling unit 430, configured to: judge whether the working OLT or the optical link of the working OLT fails according to the monitoring result, and if the working OLT or the optical link of the working OLT fails, connect the protection optical link; and instruct the protection OLT to take over an ONU or ONT under the working OLT.

It is understandable that the detecting unit in this embodiment is an OD or a transceiver; the switchover control device may further include a power adjusting unit which is configured to adjust a power amplification coefficient of the protection optical link and adjust transceiving signal power of the protection OLT.

The switchover controlling units in the third and fourth embodiments are configured to perform judgment and control inside the switchover control device, and may be integrated in existing entity hardware, for example, in the embedded OLT, OA, OEO transceiver, OD, LC, or transceiver.

Embodiment 6

Figure 14:
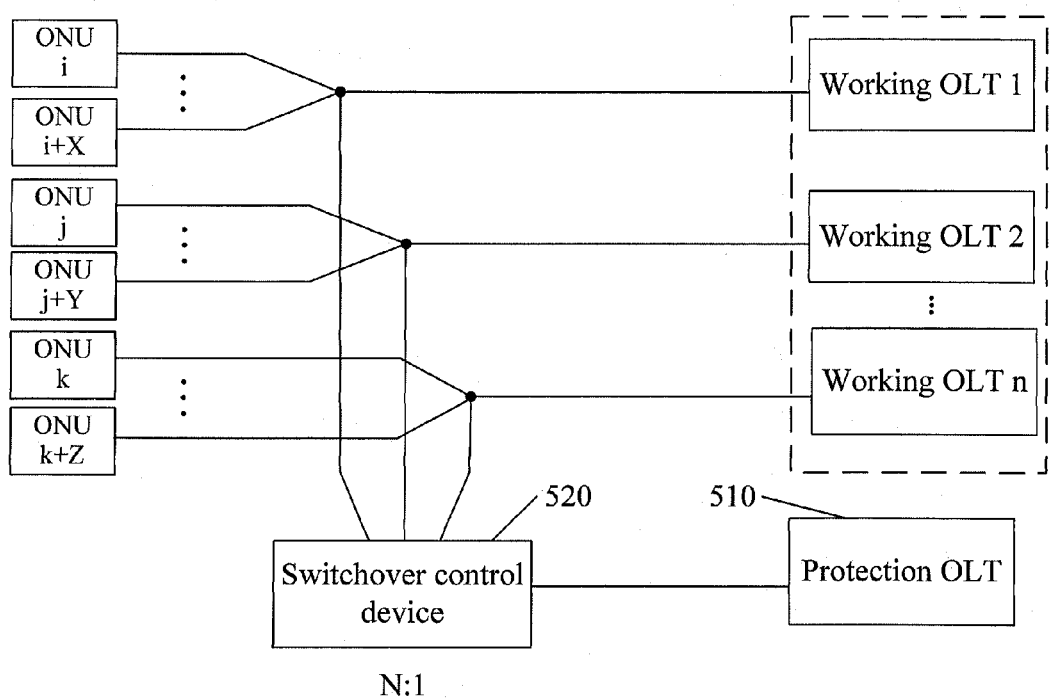
FIG. 14 is a schematic structure diagram of a PON protection system according to a sixth embodiment of the present application.

A PON protection system is provided. As shown in FIG. 14, the system includes: a protection OLT 510, a switchover control device 520, a protection OLT 530, and a working OLT1 to a working OLTn (where n is an integer greater than 1) and corresponding optical links, where the protection OLT communicates with the switchover control device through L2CP/OMCI/Ethernet OAM messages.

The switchover control device 520, connected to the optical links of the OLT1 to OLTn, is configured to receive a switchover request and connect, according to the information about a working OLT or the optical link information of the working OLT, the protection optical link, where the switchover request may be sent by the protection OLT 520 or IP edge node or the ONU or EB under the working OLT and may carry the information about the working OLT or optical link information of the working OLT.

The protection OLT 510 is configured to send the switchover request to the switchover control device and take over an ONU or ONT under the working OLT after the protection optical link is connected.

Embodiment 7

Figure 15:
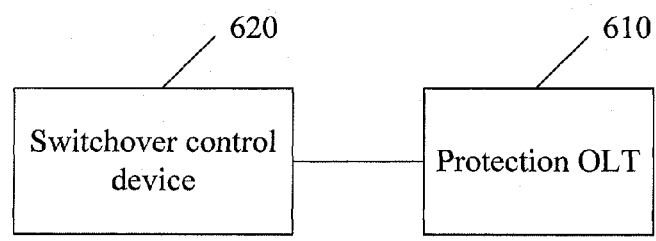
FIG. 15 is a schematic structure diagram of a PON protection system according to a seventh embodiment of the present application.

A PON protection system is provided. As shown in FIG. 15, the system includes a switchover control device 620 and a protection OLT 620, where the protection OLT communicates with the switchover control device through L2CP/OMCI/Ethernet OAM messages.

The switchover control device 610, connected to optical splitting devices on optical links of at least two working OLTs, is configured to: monitor optical transmission data from an ONU or ONT port by using an optical splitting device connected to an optical link of a working OLT, judge whether the working OLT or the optical link of the working OLT fails according to the monitoring result, and if the working OLT or the optical link of the working OLT fails, connect a protection optical link; and The protection OLT 620 is configured to take over an ONU or ONT under the working OLT through the protection optical link after the switchover control device 610 connects the protection optical link.

For the switchover control device and the method that is applicable to the PON protection system according to embodiments of the present application, refer to the descriptions of the method embodiments provided in the present application. In the systems of the sixth and seventh embodiments above, the protection OLT, the switchover control device, and the working OLT may communicate with each other through L2CP or OMCI messages.

A PON protection method, a switchover control device, and a PON protection system according to embodiments of the present application are described in detail. Although the principle and implementations are described with reference to some exemplary embodiments, the above mentioned embodiments are only intended to help understand the claims. It is apparent that those skilled in the art can make modifications and variations to the embodiments without departing from the spirit and scope of the claims. Therefore, the content of the specification shall not be construed as a limitation on the claims.

What is claimed is:

1. A passive optical network (PON) protection method, comprising:
monitoring, by a switchover control device, optical transmission data from ports of an optical network unit (ONU) or optical network terminal (ONT) via an optical splitting device connected to an optical link of a working optical line terminal (OLT);
determining whether the working OLT or the optical link of the working OLT fails according to a monitoring result;

if the working OLT or the optical link of the working OLT fails, connecting a protection optical link, wherein the switchover control device is connected to optical splitting devices on optical links of at least two working OLTs and further connected to a protection OLT via the protection optical link; and instructing the protection OLT to assume control over an ONU or ONT under the working OLT;

wherein:

the switchover control device is specifically connected to the optical splitting device on the optical link of the working OLT through an optical detector, OD, or a transceiver; and monitoring, by the switchover control device, the optical transmission data from the ONU or ONT port by using the optical splitting device connected to the optical link of the working OLT comprises:

monitoring, by the OD or transceiver, uplink optical transmission data from the ONU or ONT port by using the optical splitting device connected to the optical link of the working OLT;

wherein after instructing the protection OLT to take over the ONU or ONT under the working OLT, the method further comprises:

enabling, by the protection OLT, a laser, and setting up a communication connection with the ONU or ONT under the working OLT;

determining, by the switchover control device, whether the OD monitors uplink transmission data of the ONU or ONT within a preset time; and if the uplink transmission data of the ONU or ONT is monitored, the protection OLT continuing to take over the ONU or ONT under the working OLT; if the uplink transmission data of the ONU or ONT is not monitored, disabling, by the protection OLT, the laser and giving up a communication connection with the ONU or ONT.

2. The method of claim 1, wherein determining whether the working OLT or the optical link of the working OLT fails according to the monitoring result comprises:

if the switchover control device does not monitor uplink transmission data within a preset time, determining, by the switchover control device, whether the working OLT or the optical link of the working OLT has failed.

3. The method of claim 1, wherein after the protection OLT is switched over to the working OLT and assumes control over the ONU or ONT under the working OLT, the method further comprises:

determining whether abnormally emitted light occupies an uplink channel; and if abnormally emitted light occupies an uplink channel, disconnecting an uplink channel of the ONU or ONT corresponding to the abnormally emitted light.

4. A passive optical network, PON, protection system, comprises a protection optical line terminal, OLT, and a switchover control device, wherein:

the switchover control device is connected to optical splitting devices on optical links of at least two working OLTs and further connected to a protection OLT via the protection optical link, and is configured to monitor optical transmission data from ports of an optical network unit, ONU, or optical network terminal, ONT, by using an optical splitting device connected to an optical link of a working OLT, determine whether the working OLT or the optical link of the working OLT fails according to a monitoring result, and if the working OLT or the optical link of the working OLT fails, connect a protection optical link; and instruct the protection OLT to take over an ONU or ONT under the working OLT;

the system characterized in that:

the switchover control device is connected to the optical splitting device on the optical link of the working OLT through an optical detector, OD, or a transceiver; and the OD or the transceiver is configured to monitor uplink optical transmission data from the ONU or ONT port by using the optical splitting device connected to the optical link of the working OLT;

the protection OLT is configured to enable a laser and set up a communication connection with the ONU or ONT under the working OLT;

the switchover control device is further configured to determine whether the OD monitors uplink transmission data of the ONU or ONT within a preset time;

the protection OLT is further configured to continue to take over the ONU or ONT under the OLT if the uplink transmission data of the ONU or ONT is monitored, or disable the laser and give up a communication connection with the ONU or ONT if the uplink transmission data of the ONU or ONT is not monitored.

* * * * *